(12) United States Patent
Tanigawa et al.

(10) Patent No.: US 11,318,661 B2
(45) Date of Patent: May 3, 2022

(54) FILAMENT WINDING DEVICE AND BOBBIN REPLACEMENT METHOD

(71) Applicant: Murata Machinery, Ltd., Kyoto (JP)

(72) Inventors: Motohiro Tanigawa, Kyoto (JP); Tadashi Uozumi, Kyoto (JP); Tetsuya Matsuura, Kyoto (JP); Hirotaka Wada, Kyoto (JP); Tatsuhiko Nishida, Kyoto (JP); Shu Ikezaki, Kyoto (JP); Daigoro Nakamura, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 187 days.

(21) Appl. No.: 16/643,013

(22) PCT Filed: Aug. 3, 2018

(86) PCT No.: PCT/JP2018/029286
§ 371 (c)(1),
(2) Date: Feb. 28, 2020

(87) PCT Pub. No.: WO2019/054084
PCT Pub. Date: Mar. 21, 2019

(65) Prior Publication Data
US 2020/0307947 A1    Oct. 1, 2020

(30) Foreign Application Priority Data

Sep. 15, 2017   (JP) .............................. JP2017-177370

(51) Int. Cl.
*B65H 51/20*        (2006.01)
*B65H 67/02*        (2006.01)
(Continued)

(52) U.S. Cl.
CPC ............ *B29C 53/64* (2013.01); *B29C 53/602* (2013.01); *B29C 53/8016* (2013.01);
(Continued)

(58) Field of Classification Search
CPC ..... B65H 51/20; B65H 67/02; B65H 2701/13
See application file for complete search history.

(56) References Cited

U.S. PATENT DOCUMENTS

2013/0306783 A1   11/2013   Tanigawa et al.

FOREIGN PATENT DOCUMENTS

| JP | 5237284 U   | 3/1977 |
| JP | 09-25060 A  | 1/1997 |

(Continued)

OTHER PUBLICATIONS

Machine Translation of JP 2009-066917 A, Apr. 2, 2009. (Year: 2009).*

(Continued)

*Primary Examiner* — William E Dondero
(74) *Attorney, Agent, or Firm* — DLA Piper LLP (US)

(57) ABSTRACT

A filament winding device includes: a helical winder which winds a fiber bundle around a liner; a bobbin supporting shaft which rotatably supports a bobbin for providing the fiber bundle to the helical winder and a bobbin different from the bobbin in a state in which winding-initiation ends of the fiber bundle wound around the bobbin and winding-termination ends of the fiber bundle wound around the bobbin connect to each other; and a fiber bundle storage unit. The fiber bundle storage unit has a stopper which can switch the fiber bundle storage unit between a storage state in which the fiber bundle is stored in the fiber bundle storage unit and a storage-released state in which the fiber bundle has been released from storage in the fiber bundle storage unit and the fiber bundle is supplied from the fiber bundle storage unit to the helical winding unit.

9 Claims, 15 Drawing Sheets

(51) Int. Cl.
*B29C 53/64* (2006.01)
*B29C 53/80* (2006.01)
*B29C 53/60* (2006.01)

(52) U.S. Cl.
CPC ............. *B65H 51/20* (2013.01); *B65H 67/02* (2013.01); *B65H 2701/31* (2013.01)

(56) References Cited

FOREIGN PATENT DOCUMENTS

| | | |
|---|---|---|
| JP | H09-175738 A | 7/1997 |
| JP | 2005-154908 A | 6/2005 |
| JP | 2009-066917 A | 4/2009 |
| JP | 2013-028470 A | 2/2013 |
| JP | 2014-231145 A | 12/2014 |
| WO | 2012/043342 A1 | 4/2012 |

OTHER PUBLICATIONS

Machine Translation of JP 2014-2311145 A, Dec. 11, 2014. (Year: 2014).*
Machine Translation of JP 2013-028470 A, Feb. 7, 2013. (Year: 2013).*
Notice of Reasons for Refusal dated Nov. 4, 2020, of counterpart Japanese Application No. 2019-541946, with English translation.

* cited by examiner

AXIAL DIRECTION

AXIAL DIRECTION

FILAMENT WINDING DEVICE AND BOBBIN REPLACEMENT METHOD

TECHNICAL FIELD

This disclosure relates to a filament winding device configured to wind fiber bundles onto a liner and a bobbin replacement method for the filament winding device.

BACKGROUND

Japanese Laid-Open Patent Publication No. 2014-231145 discloses a filament winding device that winds a carbon fiber impregnated with resin onto a cylindrical member such as a liner. The filament winding device includes a helical winding unit that performs helical winding to the liner and a fiber supply unit that supplies the carbon fiber to the helical winding unit. To be more specific, the fiber supply unit includes a bobbin shaft that supports two bobbins for fiber supply to be aligned and rotatable, and carbon fibers wound on one of the bobbins is supplied to the helical winding unit.

A fiber winding terminal end portion of the carbon fiber wound on the other one of the bobbins (i.e., outer end portion in the radial direction of the bobbin) is adhered and fixed to a fiber winding start end portion of the carbon fiber wound on the one of the bobbins (i.e., the inner end portion in the radial direction of the bobbin). With this arrangement, after one of the bobbins becomes empty, a carbon fiber can be uninterruptedly supplied to the helical winding unit from the other one of the bobbins. The empty bobbin is replaced with another fully-wound bobbin, and the end portion of the carbon fiber wound on the new bobbin is adhered and fixed to the end portion of the carbon fiber of the bobbin from which the carbon fiber is being supplied.

When the end portions of the carbon fibers wound on the two bobbins are adhered and fixed to each other, it is necessary to stop the rotation of the two bobbins. In other words, when the adhesion and fixation are performed, supply of the carbon fiber from the bobbin to the helical winding unit is temporarily stopped. For this reason, even if the adhesion and fixation need to be done such as during the winding of a fiber bundle, the adhesion and fixation cannot be done in the filament winding device of JP '145.

It could therefore be helpful to make it possible to connect end portions of fiber bundles wound on different bobbins, even when the fiber bundle is being wound.

SUMMARY

We thus provide:
A filament winding device includes: a winding unit which is configured to wind a fiber bundle onto a liner; a bobbin supporting shaft which rotatably supports a supplying bobbin supplying the fiber bundle to the winding unit and a reserve bobbin which is different from the supplying bobbin, the supplying bobbin and the reserve bobbin being supported in a state in which a winding start end portion of a fiber bundle wound on the supplying bobbin is connected to a winding terminal end portion of a fiber bundle wound on the reserve bobbin; and a fiber bundle storage unit which is provided between the bobbin supporting shaft and the winding unit in a running direction of the fiber bundle and temporarily stores the fiber bundle supplied to the winding unit, the fiber bundle storage unit including: a switching unit which is able to switch a state of the fiber bundle storage unit between a storage state in which the fiber bundle is being stored by the fiber bundle storage unit and a storage cancellation state in which storing of the fiber bundle by the fiber bundle storage unit is canceled and the fiber bundle is being supplied from the fiber bundle storage unit to the winding unit.

The supplying bobbin and the reserve bobbin are rotatably supported by the bobbin supporting shaft. Because the winding start end portion of the fiber bundle of the supplying bobbin (i.e., the inner end portion of the fiber bundle in the radial direction of the supplying bobbin) is joined with the winding terminal end portion of the fiber bundle of the reserve bobbin (i.e., the outer end portion of the fiber bundle in the radial direction of the reserve bobbin), it is possible to continue the supply of the fiber bundle to the winding unit from the reserve bobbin even after the supplying bobbin becomes empty.

When the supplying bobbin becomes empty, it is necessary to perform replacement of the empty bobbin with a fully-wound new bobbin and to perform joining of an end portion of the fiber bundle of the reserve bobbin from which the fiber bundle is being supplied with an end portion of the fiber bundle of the new bobbin. Because it is extremely difficult to perform the joining while the bobbins are rotating, it is necessary to stop the rotation of the reserve bobbin and the new bobbin at least during the joining. The state of the fiber bundle storage unit is switched between the storage state and the storage cancellation state by the switching unit. When it is unnecessary to stop the rotation of the reserve bobbin from which the fiber bundle is being supplied, the fiber bundle storage unit is maintained at the storage state and hence the fiber bundle is stored in the fiber bundle storage unit. Meanwhile, when the joining needs to be done, the fiber bundle storage unit is switched to the storage cancellation state. With this, it becomes possible to perform the joining while the fiber bundle stored in the fiber bundle storage unit is being supplied to the winding unit, even though the rotation of the reserve bobbin and the rotation of the new bobbin are stopped. On this account, the joining can be done while the winding of the fiber bundle is being performed.

The filament winding device above may be arranged such that the fiber bundle storage unit includes: a first roller on which the fiber bundle is placed; a second roller on which the fiber bundle is placed, the fiber bundle being stored between the first roller and the second roller in the running direction; and a third roller which is provided between the first roller and the second roller in the running direction and is movable relative to the first roller and the second roller in an intersecting direction which intersects with a linear line connecting the center of the first roller with the center of the second roller, and the switching unit causing the fiber bundle storage unit to be in the storage state by maintaining the third roller at a predetermined storage position in the intersecting direction, and causing the fiber bundle storage unit to be in the storage cancellation state by allowing the third roller at the storage position to move to a position close to the first roller and the second roller as compared to the storage position in the intersecting direction.

The fiber bundle storage unit is set at the storage state as the third roller is maintained at the storage position by the switching unit, and the fiber bundle storage unit is set at the storage cancellation state as the third roller is allowed to move to a position close to the first roller and the second roller as compared to the storage position by the switching unit. In this way, switching between the storage state and the storage cancellation state is realized by the simple arrangement.

The filament winding device immediately above may be arranged so that the switching unit includes a stopper which is able to prohibit the third roller from moving toward the first roller and the second roller in the intersecting direction and allow the third roller to move toward the first roller and the second roller in the intersecting direction.

When the third roller is at the above-described storage position, the movement of the third roller toward the first roller and the second roller in the intersecting direction is prohibited by the stopper. It is therefore possible to maintain the fiber bundle storage unit at the storage state. Furthermore, when rotation of the two bobbins is stopped to perform the joining, the movement of the third roller toward the first roller and the second roller in the intersecting direction is allowed, and hence the third roller becomes movable to shorten the fiber bundle stored in the fiber bundle storage unit. (In other words, the fiber bundle storage unit is switched to the storage cancellation state.) In this way, by the simple arrangement, the fiber bundle storage unit can be maintained at the storage state and the fiber bundle storage unit can be switched from the storage state to the storage cancellation state.

The filament winding device immediately above may be arranged such that the stopper includes a press portion which is able to press the third roller away from the first roller and the second roller in the intersecting direction, and the press portion is movable between a first position where the third roller is pressed and maintained at the storage position and a second position where the press portion is close to the first roller and the second roller as compared to the first position in the intersecting direction.

When the press portion of the stopper is at the first position, the third roller is maintained at the storage position and the fiber bundle storage unit is maintained at the storage state. As the press portion moves from the first position to the second position, the movement of the third roller is allowed and the fiber bundle storage unit is switched to the storage cancellation state. Furthermore, as the press portion moves from the second position to the first position, the third roller is returned to the storage position by the press portion and the fiber bundle storage unit returns to the storage state. In this way, the state of the fiber bundle storage unit is switched between the storage state and the storage cancellation state by the simple arrangement.

The filament winding devices above may further include a stopping portion which is configured to stop rotation of the supplying bobbin and rotation of the reserve bobbin.

Even when the winding unit is in operation, the joining can be performed at any timing by switching the fiber bundle storage unit to the storage cancellation state and forcibly stopping the rotation of the supplying bobbin and the rotation of the reserve bobbin by the stopping portion. Furthermore, because unintentional rotation of the supplying bobbin and the reserve bobbin is prevented by the stopping portion during the joining which is performed while the winding unit is in operation, the joining can be safely done.

The filament winding devices above may be arranged such that the bobbin supporting shaft is able to support the supplying bobbin and the reserve bobbin to be aligned in an axial direction of the bobbin supporting shaft, and the supplying bobbin and the reserve bobbin are rotatable together.

Because the supplying bobbin and the reserve bobbin are supported to be aligned in the axial direction (i.e., coaxially) and can be rotated together with the bobbin supporting shaft, the supplying bobbin and the reserve bobbin rotate certainly at the same rotation speed. It is therefore possible to ensure the prevention of problems such as twist of the end portions of the fiber bundles of the two bobbins, which are connected to each other.

The filament winding device immediately above may be arranged such that the bobbin supporting shaft includes: a first supporting shaft which is rotatable together with one of the supplying bobbin and the reserve bobbin; a second supporting shaft which is rotatable together with the other one of the supplying bobbin and the reserve bobbin; and a connecting portion which is provided between the first supporting shaft and the second supporting shaft in the axial direction and is able to connect the first supporting shaft with the second supporting shaft to be rotatable together and to disconnect the first supporting shaft from the second supporting shaft.

When the first supporting shaft and the second supporting shaft are connected to each other by the connecting portion, the first supporting shaft and the second supporting shaft rotate together and the supplying bobbin and the reserve bobbin rotate at the same rotation speed. When the supplying bobbin becomes empty and the supply of the fiber bundle to the winding unit is continued from the reserve bobbin, the rotation of only the empty bobbin (previous supplying bobbin) can be stopped by disconnecting the first supporting shaft from the second supporting shaft. On this account, the replacement of the empty bobbin can be done while the supply of the fiber bundle from the reserve bobbin to the winding unit is continued (i.e., without canceling the storing of the fiber bundle by the fiber bundle storage unit). In other words, it is unnecessary to cancel the storing of the fiber bundle during the replacement, and the cancelation of the storing of the fiber bundle to stop the rotation of the two bobbins is only required during the joining. The time for keeping the fiber bundle storage unit to be in the storage cancellation state is therefore short, and the fiber bundle stored in the fiber bundle storage unit is less likely to run out.

The filament winding device immediately above may further include a supporter which rotatably supports end portions of the first supporting shaft and the second supporting shaft, the end portions being on the side opposite to the connecting portion in the axial direction, when the first supporting shaft is disconnected from the second supporting shaft, the supporter being able to separate the first supporting shaft from the second supporting shaft.

When a bobbin is replaced, it is necessary to detach and attach the bobbin from and to the bobbin supporting shaft by moving the bobbin in the axial direction. For this reason, when, for example, the bobbin supporting shaft is cantilevered (i.e., only one of the first supporting shaft or the second supporting shaft is rotatably supported), the following problem occurs. When a bobbin on the base end side becomes empty and the empty bobbin on the base end side is replaced with a new bobbin while a fiber bundle is being supplied to a winding unit from a bobbin on the leading end side, it is impossible to detach the empty bobbin from the leading end side because the empty bobbin interferes with the bobbin on the leading end side. An arrangement for detaching the bobbin on the base end side from the base end side is therefore necessary, and such an arrangement may complicate the structure of the device. The supporter rotatably supports end portions of the first supporting shaft and the second supporting shaft, the end portions being on the side opposite to the connecting portion in the axial direction. In other words, the supporter supports the both end portions of the bobbin supporting shaft. Furthermore, the first supporting shaft and the second supporting shaft can be separated from each other when they are disconnected from each other. Therefore, in the replacement, the bobbin can be detached or attached by separating the first supporting shaft and the second supporting shaft from each other. This suppresses the device from being structurally complicated.

The filament winding device immediately above may be arranged such that at least one of the first supporting shaft or the second supporting shaft is movable at least in a direction orthogonal to the axial direction, when the first supporting shaft is disconnected from the second supporting shaft.

When a bobbin is replaced, it is necessary to move the bobbin in the axial direction. On this account to detach or attach the bobbin, a space which is at least as long as the bobbin must be provided on an extension line in the axial direction of the bobbin supporting shaft. For this reason, when the first supporting shaft and the second supporting shaft can be separated only in the axial direction in the eight aspect, it is necessary to separate them from each other by the length of the bobbin in the axial direction, and a space for the replacement needs to be large in the axial direction. This may result in increase in size of the device. The first supporting shaft and the second supporting shaft are movable at least in the direction orthogonal to the axial direction. In other words, it is possible to arrange the shaft center of the first supporting shaft and the shaft center of the second supporting shaft to be deviated from each other. With this arrangement, the bobbin attached to the first supporting shaft can be detached or attached by utilizing the space on the second supporting shaft side in the axial direction. Likewise, the bobbin attached to the second supporting shaft can be detached or attached by utilizing the space on the first supporting shaft side in the axial direction. It is therefore possible to avoid the increase in size of the device.

A bobbin replacement method used in the filament winding device, the filament winding device being provided with a winding unit which is configured to wind a fiber bundle onto a liner, and a bobbin supporting shaft which rotatably supports a supplying bobbin supplying the fiber bundle to the winding unit and a reserve bobbin which is different from the supplying bobbin, the supplying bobbin and the reserve bobbin being supported in a state in which a winding start end portion of a fiber bundle wound on the supplying bobbin is connected to a winding terminal end portion of a fiber bundle wound on the reserve bobbin, the bobbin replacement method being a method of replacing an empty bobbin with a new bobbin while supply of the fiber bundle to the winding unit is continued from the reserve bobbin, when the supplying bobbin becomes empty while the winding unit is winding the fiber bundle onto the liner, the bobbin replacement method comprising: a replacement step of detaching the empty bobbin from the bobbin supporting shaft and attaching the new bobbin to the bobbin supporting shaft, while the rotation of the empty bobbin is stopped; a joining step of joining a winding start end portion of a fiber bundle wound on the new bobbin with a winding terminal end portion of a fiber bundle wound on the reserve bobbin while the rotation of the new bobbin and the rotation of the reserve bobbin are stopped, after the replacement step; and a rotation restart step of canceling a rotation stopped state of the new bobbin and a rotation stopped state of the reserve bobbin, after the joining step, the filament winding device further including a fiber bundle storage unit which is switchable between a storage state in which the fiber bundle storage unit temporarily stores the fiber bundle which is to be supplied to the winding unit and a storage cancellation state in which the storage state is canceled, and the fiber bundle storage unit being maintained at the storage state at least until the replacement step, the fiber bundle storage unit being switched from the storage state to the storage cancellation state before the rotation of the reserve bobbin is stopped, and the fiber bundle storage unit being switched from the storage cancellation state to the storage state after the rotation restart step.

An empty bobbin is replaced with a new bobbin while supply of the fiber bundle to the winding unit is continued from the reserve bobbin, when the supplying bobbin becomes empty. Before rotation of the reserve bobbin is stopped, the fiber bundle storage unit is switched from the storage state to the storage cancellation state. On this account, the joining step can be performed while the fiber bundle is supplied from the fiber bundle storage unit to the winding unit, even after the rotation of the reserve bobbin is stopped. Furthermore, as the fiber bundle storage unit is switched from the storage cancellation state to the storage state after the rotation restart step, the fiber bundle can be stored again. As such, the joining step can be executed while the winding of the fiber bundle is being performed.

The bobbin replacement method immediately above may be arranged such that, in the replacement step, the rotation of the reserve bobbin is not stopped and the fiber bundle storage unit is maintained at the storage state.

The fiber bundle storage unit is maintained at the storage state in the replacement step. The fiber bundle supplied from the reserve bobbin can therefore be stored in the fiber bundle storage unit even during the replacement step, with the result that the time in which the fiber bundle storage unit is maintained at the storage cancellation state is further shortened. For this reason, the fiber bundle stored in the fiber bundle storage unit is less likely to run out.

Figure 7A:
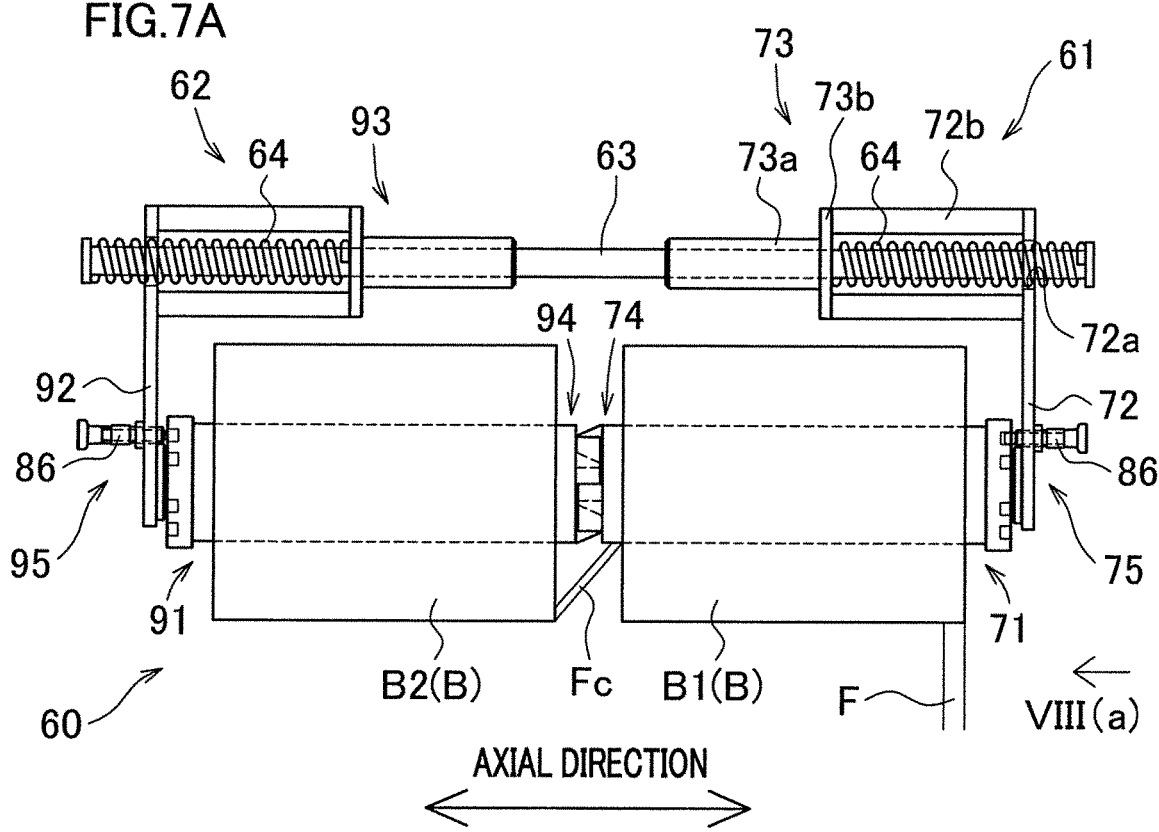
Figure 7B:
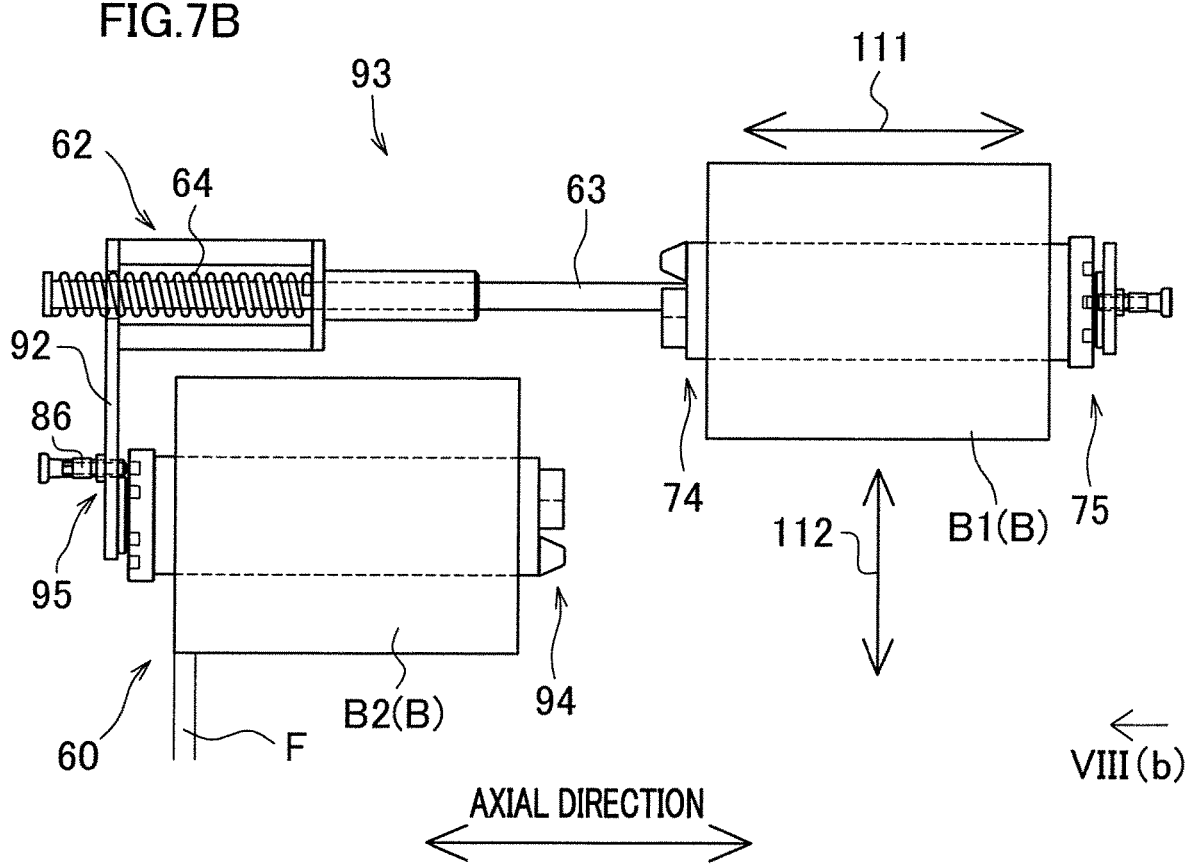

Each of FIGS. 7A and 7B is a front elevation of the bobbin supporter.

Figure 8A:
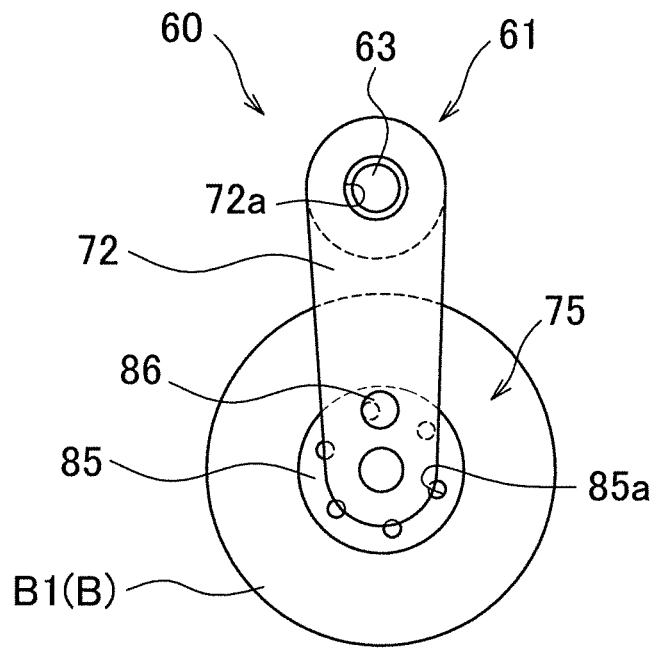
Figure 8B:
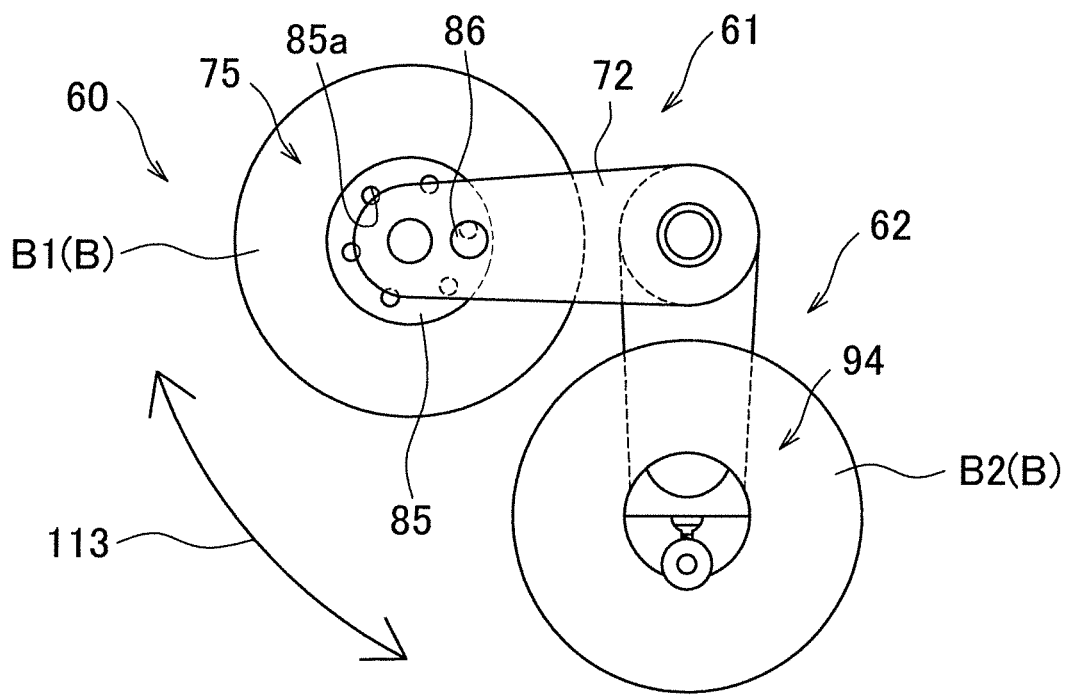

Each of FIGS. 8A and 8B is a side elevation of the bobbin supporter.

Figure 9A:
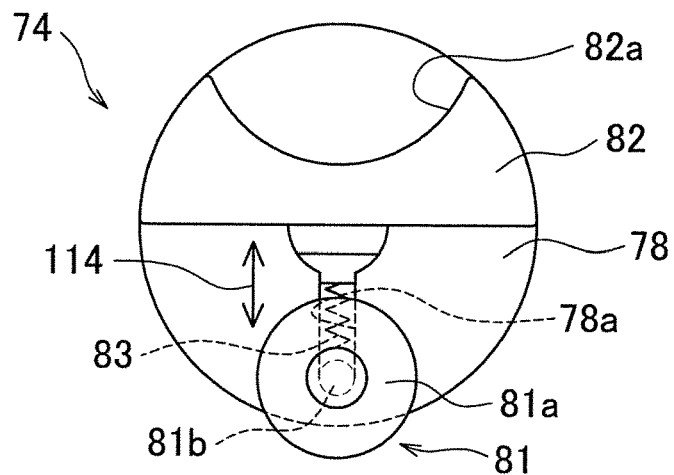
Figure 9B:
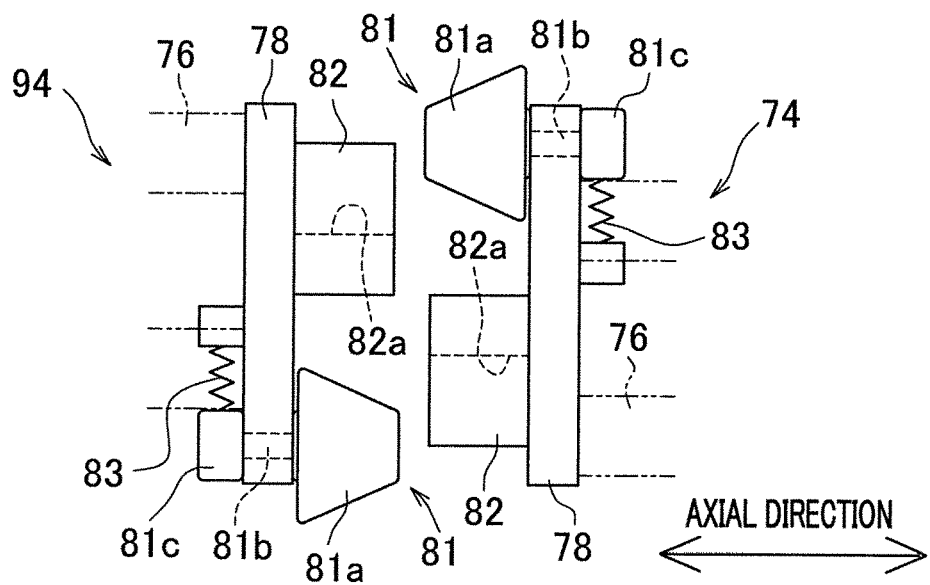
Figure 9C:
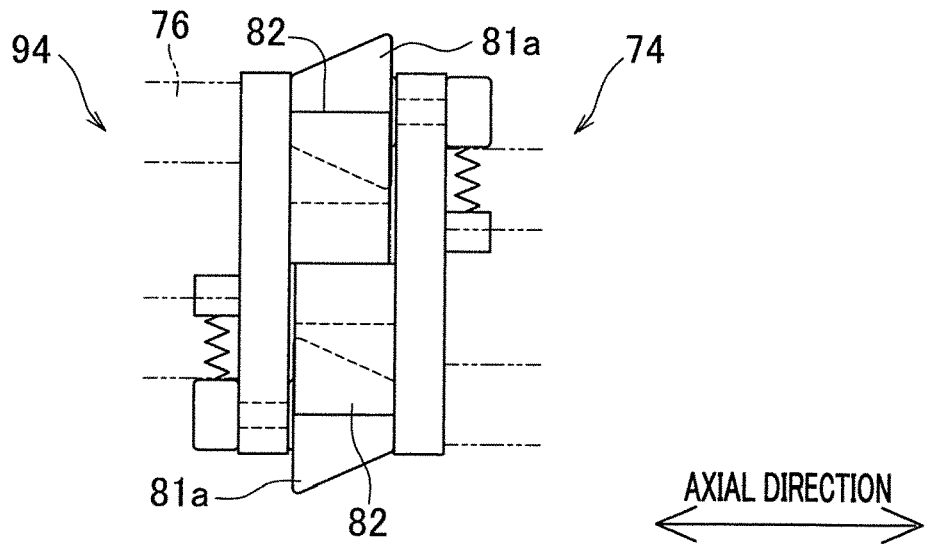

Each of FIGS. 9A to 9C shows a connecting portion of the bobbin supporter.

Figure 10A:
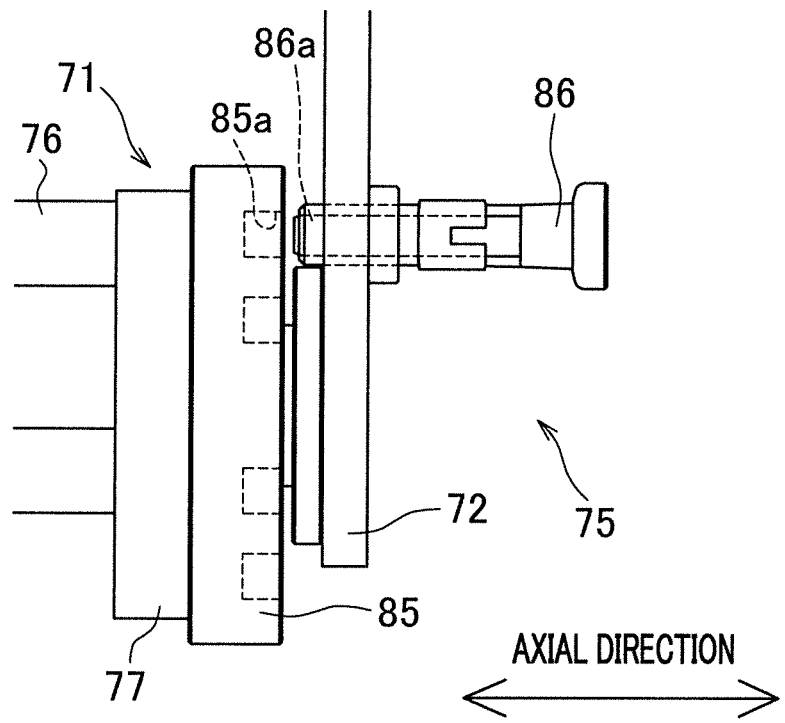
Figure 10B:
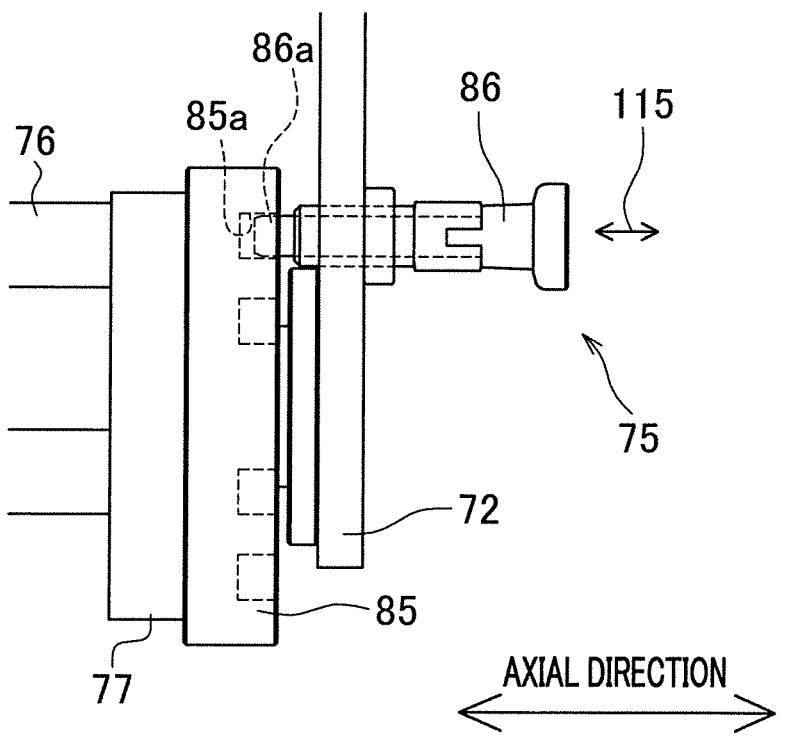

Each of FIGS. 10A and 10B shows a stopping portion of the bobbin supporter.

Figure 11:
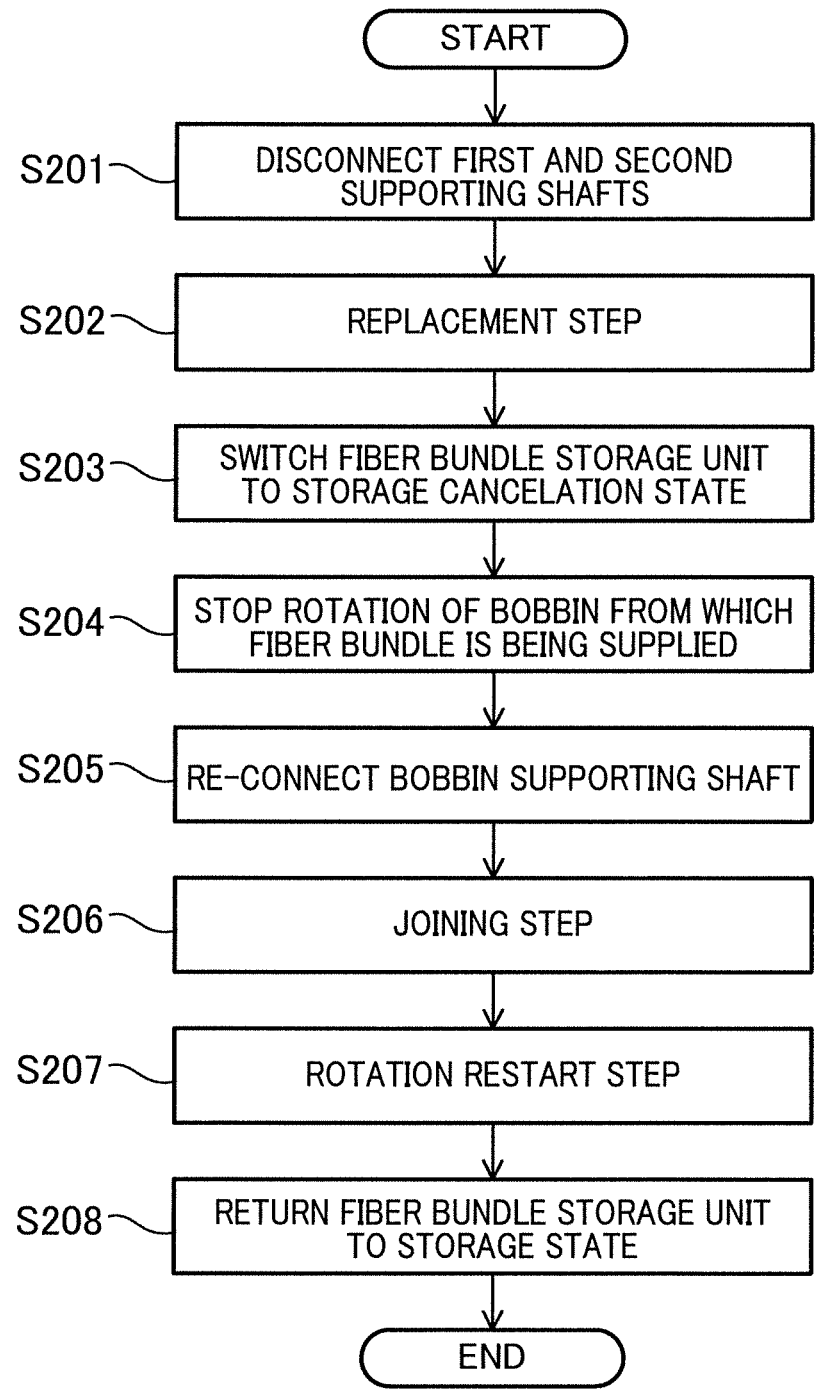

FIG. 11 is a flowchart showing a series of steps of bobbin replacement.

Each of FIGS. 12A to 12F shows a state of the bobbin supporter and the fiber bundle storage unit in the bobbin replacement.

Each of FIGS. 13A to 13F shows a state of the bobbin supporter and the fiber bundle storage unit in the bobbin replacement.

Each of FIGS. 14A to 14F shows a state of the bobbin supporter and the fiber bundle storage unit in the bobbin replacement.

Figure 15:
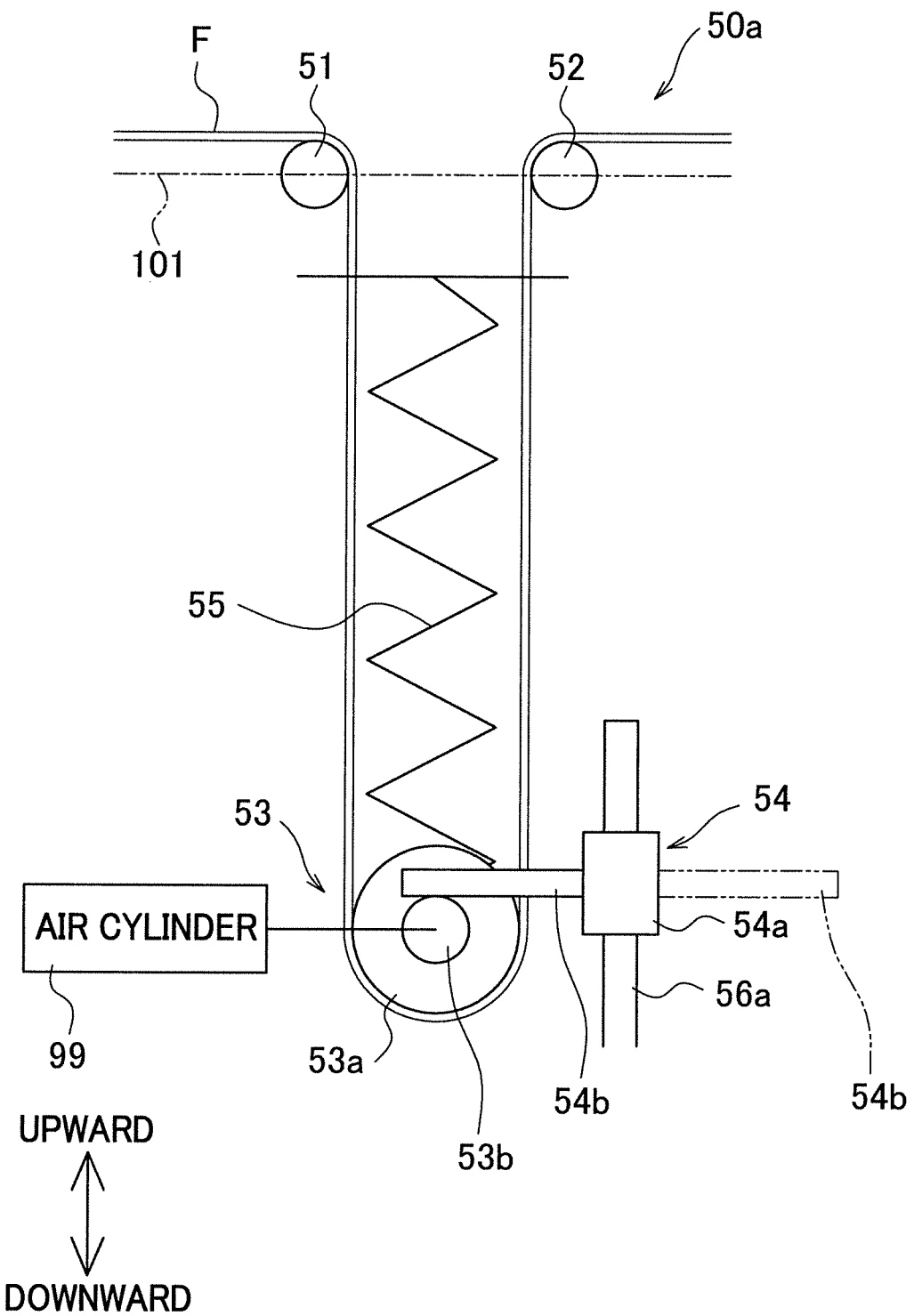

FIG. 15 relates to a modification and is a schematic diagram of a fiber bundle storage unit.

REFERENCE SIGNS LIST

1 filament winding device
40 helical winding unit (winding unit)

50 fiber bundle storage unit
51 first roller
52 second roller
53 third roller
53b pressed member
54 stopper (switching unit)
54b press portion
60 bobbin supporter (supporter)
71 first supporting shaft (bobbin supporting shaft)
74 connecting portion
75 stopping portion
91 second supporting shaft (bobbin supporting shaft)
94 connecting portion
95 stopping portion
B1 bobbin (supplying bobbin, empty bobbin)
B2 bobbin (reserve bobbin)
B3 bobbin (new bobbin)
F fiber bundle
L liner

DETAILED DESCRIPTION

The following will describe an example with reference to FIGS. 1 to 14. Hereinafter, forward, rearward, leftward, and rightward directions shown in FIG. 1 will be consistently used for convenience of explanation. Furthermore, the direction orthogonal to the forward, rearward, leftward, and rightward directions is referred to as an up-down direction in which the gravity acts (intersecting direction).

Outline of Filament Winding Device

Figure 1:
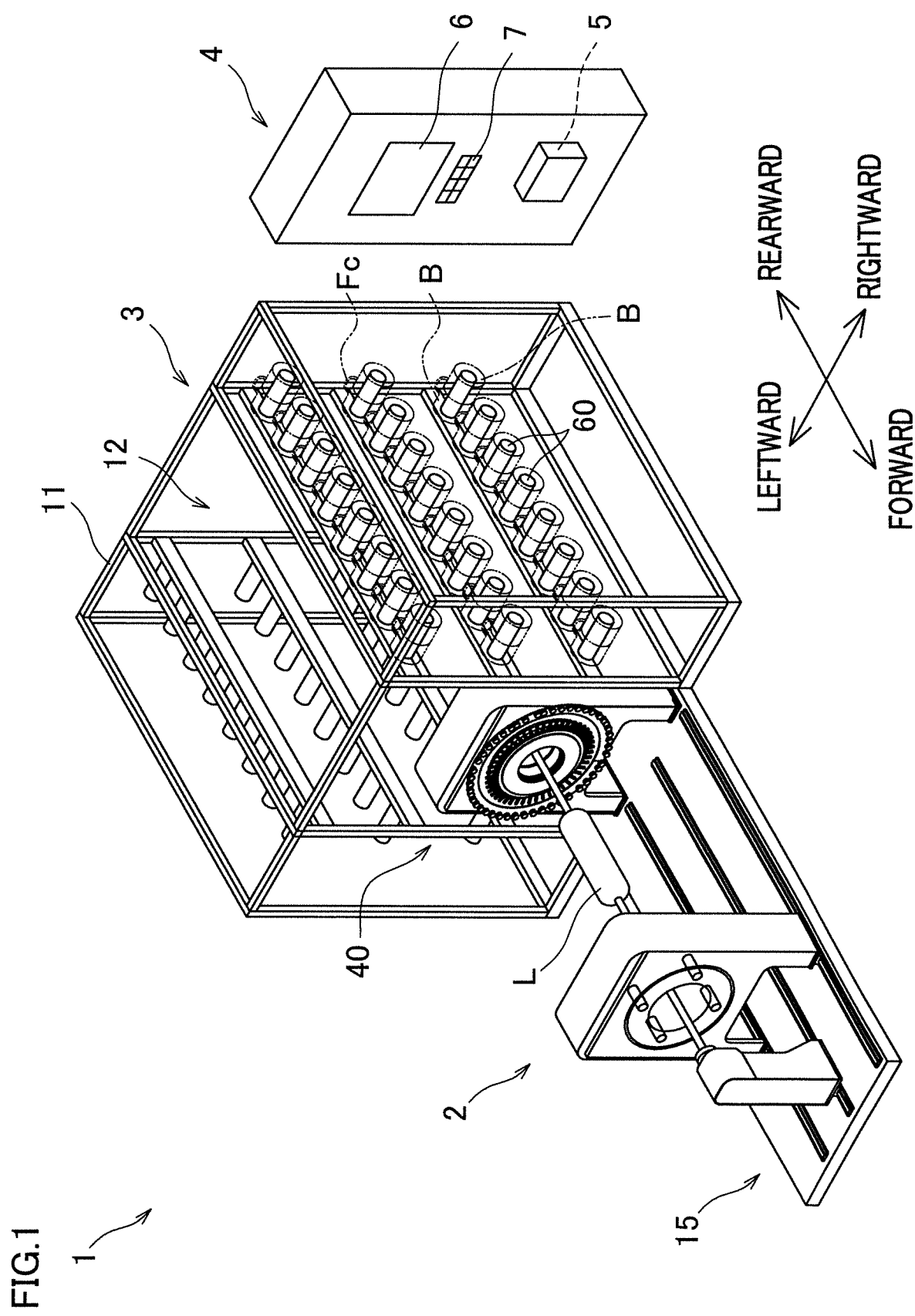
FIG. 1 is a perspective view of a filament winding device of an example

To begin with, a filament winding device 1 will be outlined with reference to FIG. 1. The filament winding device 1 includes a winder 2, a creel stand 3, and a control panel 4.

The winder 2 winds fiber bundles onto a liner L. Each fiber bundle is formed by, for example, impregnating a thermosetting synthetic resin material into a fiber material such as carbon fiber. The liner L is made of, for example, high strength aluminum or the like, when a pressure tank is manufactured. The liner L includes a cylindrical portion and dome portions formed on the respective sides of the cylindrical portion. The winder 2 will be detailed later.

The creel stand 3 supplies fiber bundles to a later-described helical winding unit 40 (winding unit). The creel stand 3 includes a supporting frame 11 and bobbin supporters 60 (supporters) supported by the supporting frame 11. The supporting frame 11 is arranged to be substantially symmetrical in the left-right direction. At a central part of the supporting frame 11 in the left-right direction, an installation space 12 where the winder 2 is partially installed is formed. (Details of the inside of the installation space 12 are not shown in the drawing.) Each of the bobbin supporters 60 rotatably supports a bobbin B on which a fiber bundle to be supplied to the helical winding unit 40 is wound. Each bobbin supporter 60 is able to support two bobbins B. The bobbin supporter 60 will be detailed later.

The control panel 4 includes a controller 5, a display 6, and an operation unit 7. The controller 5 controls each part of the winder 2. The display 6 displays, for example, a winding condition of fiber bundles onto the liner L by the winder 2. The operation unit 7 is used to allow an operator to input, for example, a winding condition of the winder 2 to the controller 5.

Structure of Winder

Figure 2:
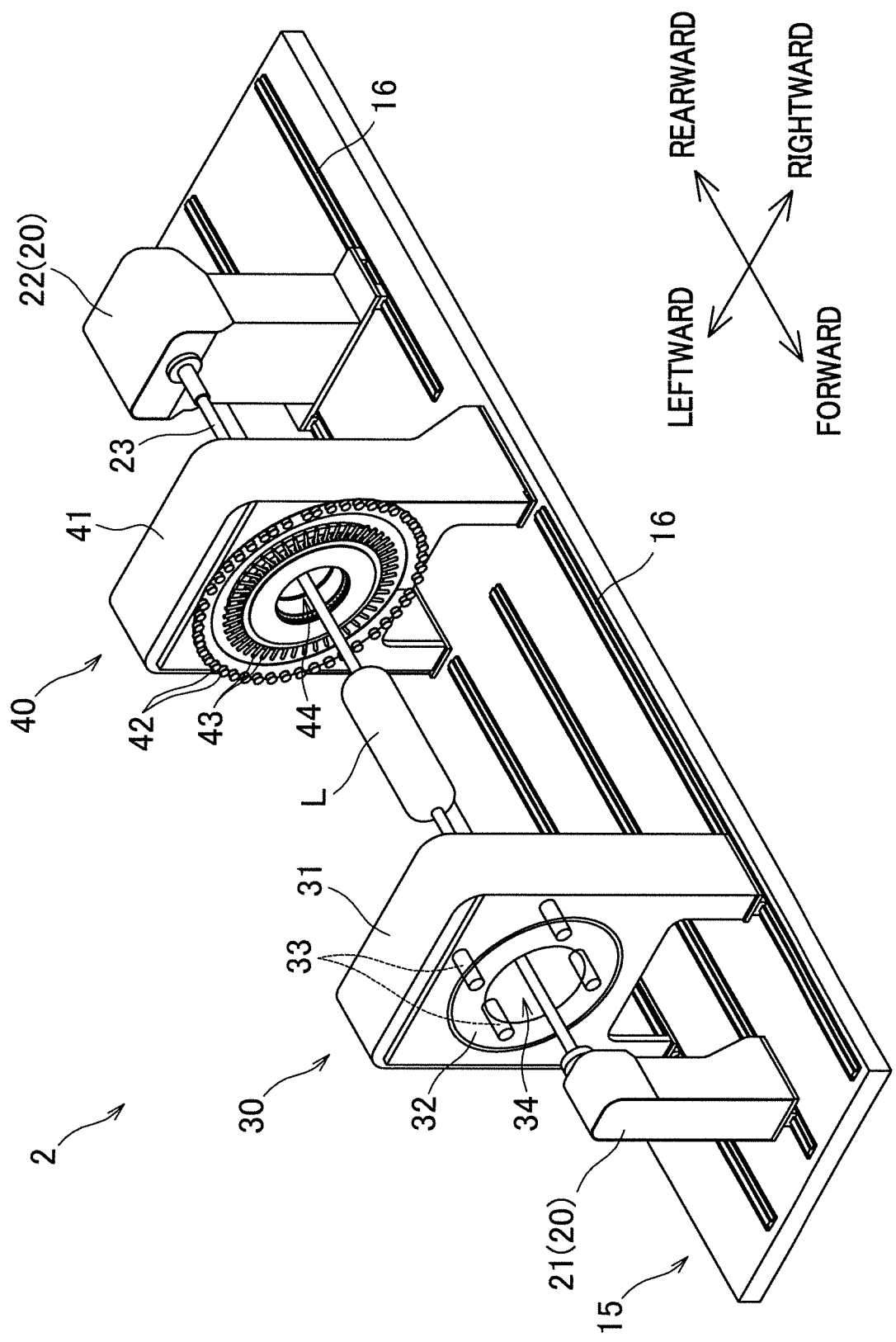
FIG. 2 is a perspective view of a winder.
Figure 3:
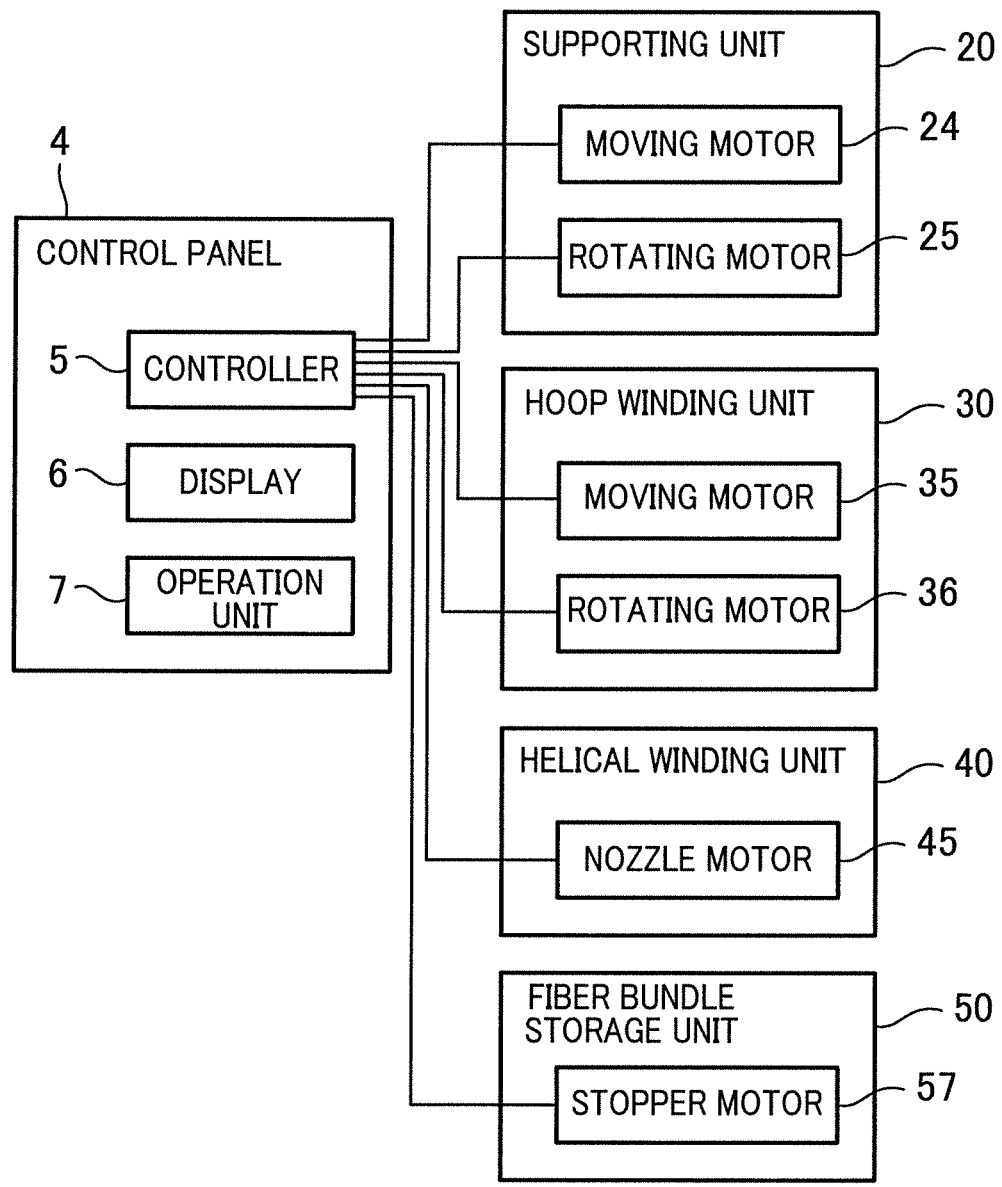
FIG. 3 is a block diagram of an electrical configuration of the filament winding device.

The following will describe the structure of the winder 2 with reference to FIGS. 2 and 3. The winder 2 includes a base 15, supporting units 20 (a first supporting unit 21 and a second supporting unit 22), a hoop winding unit 30, and a helical winding unit 40.

The base 15 supports the supporting units 20, the hoop winding unit 30, and the helical winding unit 40 (winding unit). The base 15 extends in the front-rear direction. On the base 15, the first supporting unit 21, the hoop winding unit 30, the helical winding unit 40, and the second supporting unit 22 are provided in this order from the front-side to the rear-side. On the top surface of the base 15, rails 16 are provided to extend in the front-rear direction. The supporting units 20 and the hoop winding unit 30 are provided on the rails 16 and are movable in the front-rear direction along the rails 16. The helical winding unit 40 is fixed to the base 15, at a front end portion of the installation space 12 of the creel stand 3 (see FIG. 1).

The liner supporting units 20 include the first supporting unit 21 provided in front of the hoop winding unit 30 and the second supporting unit 22 provided behind the helical winding unit 40. The supporting units 20 support the liner L so that the liner L is rotatable about a supporting shaft 23 that extends in the axial direction of the liner L (i.e., in the front-rear direction). The supporting units 20 include a moving motor 24 that moves the supporting units 20 in the front-rear direction along the rails 16 and a rotating motor 25 that rotates the liner L (see FIG. 3). The moving motor 24 and the rotating motor 25 are controlled by the controller 5.

The hoop winding unit 30 hoop-winds the fiber bundles onto the liner L (i.e., winds the fiber bundles in a direction substantially perpendicular to the axial direction of the liner L). The hoop winding unit 30 includes a main body 31 and a rotating member 32. The main body 31 is provided on the rails 16 and supports the rotating member 32 to be rotatable about the axis of the liner L. The rotating member 32 is a disc-shaped member. At a central portion in the radial direction of the rotating member 32, a circular passing hole 34 is formed to allow the liner L to pass therethrough. To the hoop winding unit 30, bobbins 33 on each of which a fiber bundle is wound are attached. The bobbins 33 are provided at regular intervals in the circumferential direction of the rotating member 32.

As shown in FIG. 3, the hoop winding unit 30 includes a moving motor 35 that moves the hoop winding unit 30 in the front-rear direction along the rails 16 and a rotating motor 36 that rotates the rotating member 32. The moving motor 35 and the rotating motor 36 are controlled by the controller 5. The controller 5 rotates the rotating member 32 while reciprocating the hoop winding unit 30 along the rails 16 so that the liner L passes through the passing hole 34 in a relative manner. As a result, the bobbins 33 revolve about the axis of the liner L, and the fiber bundles are taken out from the bobbins 33. The fiber bundles having been taken out are simultaneously hoop-wound onto the surface of the liner L.

The helical winding unit 40 helical-winds the fiber bundles onto the liner L (i.e., winds the fiber bundles in a direction substantially parallel to the axial direction of the liner L). The helical winding unit 40 includes a main body 41, a plurality of guides 42, and a plurality of nozzles 43. The main body 41 is provided to stand on the base 15 in a fixed manner. At a central portion in the left-right direction of the main body 41, a circular passing hole 44 is formed to allow the liner L to pass therethrough in the front-rear direction. The guides 42 and the nozzles 43 are provided along the circumference of the passing hole 44. Fiber bundles taken out from bobbins B provided at the creel stand 3 are led into a plurality of nozzles 43 via the guides 42. The nozzles 43 extend along the radial direction of the liner L, and guide the fiber bundles F inward in the radial direction from the outer side. Each nozzle 43 includes plural tubular members which are coaxial, nested, and different in diameter, and is radially extendable and contractable.

As shown in FIG. 3, the helical winding unit 40 includes a nozzle motor 45 used to extend and contract the nozzles 43. The nozzle motor 45 is driven and controlled by the controller 5. The controller 5 extends and contracts the nozzles 43 in accordance with the outer shape of the liner L, while reciprocating the supporting units 20 along rails 16 so that the liner L passes through the passing hole 44. As a result, the fiber bundles F taken out from the nozzles 43 are simultaneously helical-wound onto the surface of the liner L.

To start winding of the fiber bundles onto the liner L by the winder 2, to begin with, for example, an operator fixes the yarn ends of the fiber bundles to the liner L by a tape, for example. Alternatively, an apparatus that automatically fixes the yarn ends of the fiber bundles may be used. After fixation of the yarn ends of the fiber bundles to the liner L, the controller 5 drives the motors 24, 25, 35, 36, and 45 (see FIG. 3) so that, to the liner L supported by the supporting units 20, hoop-winding is performed by the hoop winding unit 30 and helical-winding is performed by the helical winding unit 40.

As described above, the bobbin supporters 60 that supply the fiber bundles to the helical winding unit 40 are each arranged to be able to support two bobbins B (see FIG. 1). The fiber bundle wound on one of the two bobbins B is supplied to the helical winding unit 40. A winding terminal end portion of the fiber bundle wound on the other one of the bobbins B (i.e., outer end portion in the radial direction of the bobbin) is adhered and fixed to a winding start end portion of the fiber bundle wound on the one of the bobbins B (i.e., the inner end portion in the radial direction of the bobbin). (In short, a joint Fc is formed as shown in FIG. 1.) With this arrangement, after one of the bobbins B becomes empty, the fiber bundle can be uninterruptedly supplied to the helical winding unit 40 from the other one of the bobbins B. After the one of the bobbins B becomes empty, the empty bobbin is replaced with another fully-wound bobbin, and the end portion of the fiber bundle wound on the new bobbin need to be adhered and fixed to the end portion of the fiber bundle of the bobbin B from which the fiber bundle is being supplied.

When the end portions of the fiber bundles wound on the two bobbins B are adhered and fixed to each other, it is necessary to stop rotation of the two bobbins B. In other words, when the adhesion and fixation are performed, supply of the fiber bundle from the bobbin B to the helical winding unit 40 is temporarily stopped. For this reason, even if the adhesion and fixation need to be done such as during the winding of a fiber bundle, adhesion and fixation cannot be done in the known configuration. To solve this problem, the filament winding device 1 has the following arrangement on the running path of the fiber bundle.

Arrangement on Running Path of Fiber Bundle

Figure 4:
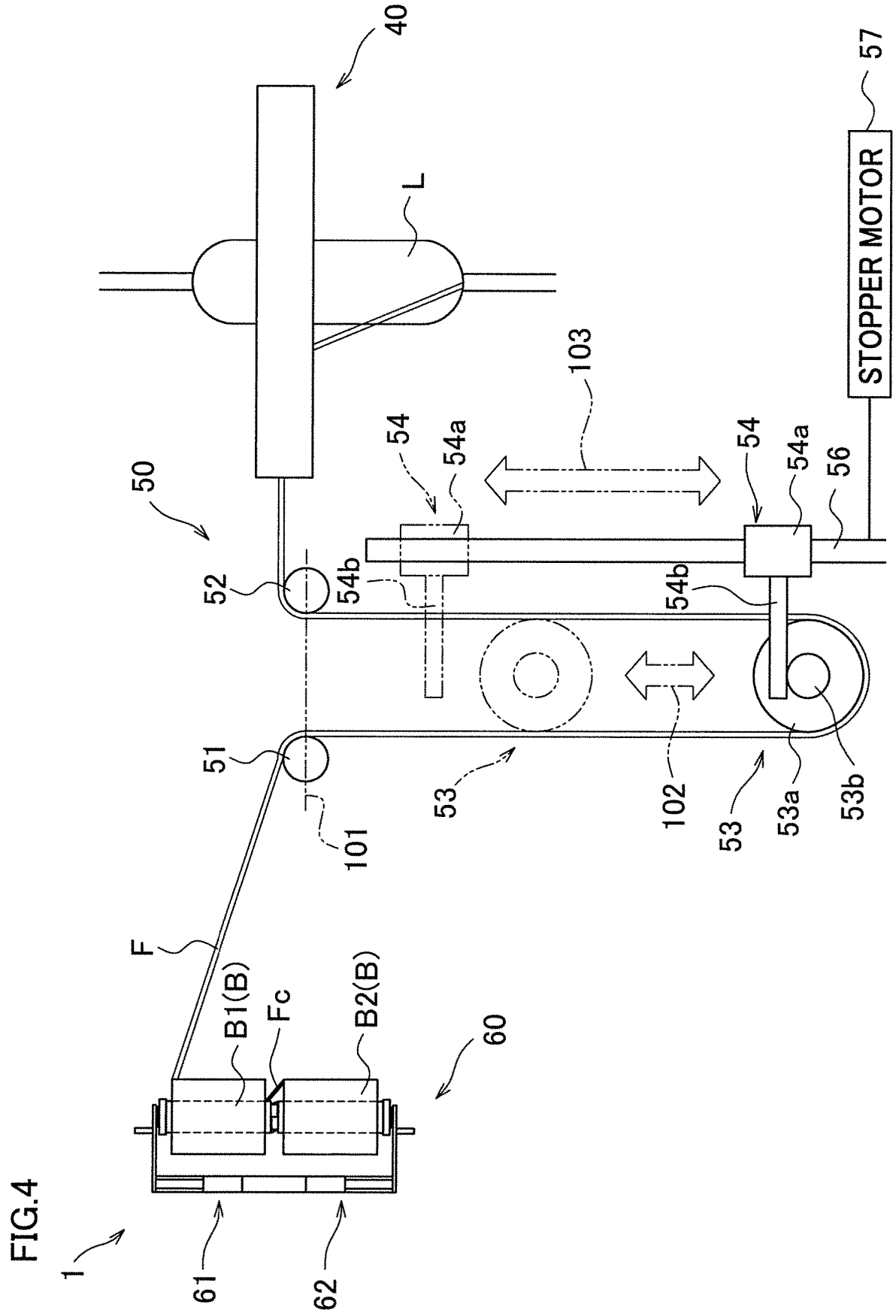
FIG. 4 is a schematic diagram of a running path of a fiber bundle.

FIG. 4 is a schematic diagram of the filament winding device 1 on the running path of the fiber bundle. As shown in FIG. 4, in the running direction of the fiber bundle F (hereinafter, this direction will be simply referred to as the running direction), a bobbin supporter 60, a fiber bundle storage unit 50, and the helical winding unit 40 are provided in this order from the upstream side. The following will describe the structure of the fiber bundle storage unit 50, and then describe the structure of the bobbin supporter 60.

Fiber Bundle Storage Unit

Figure 5:
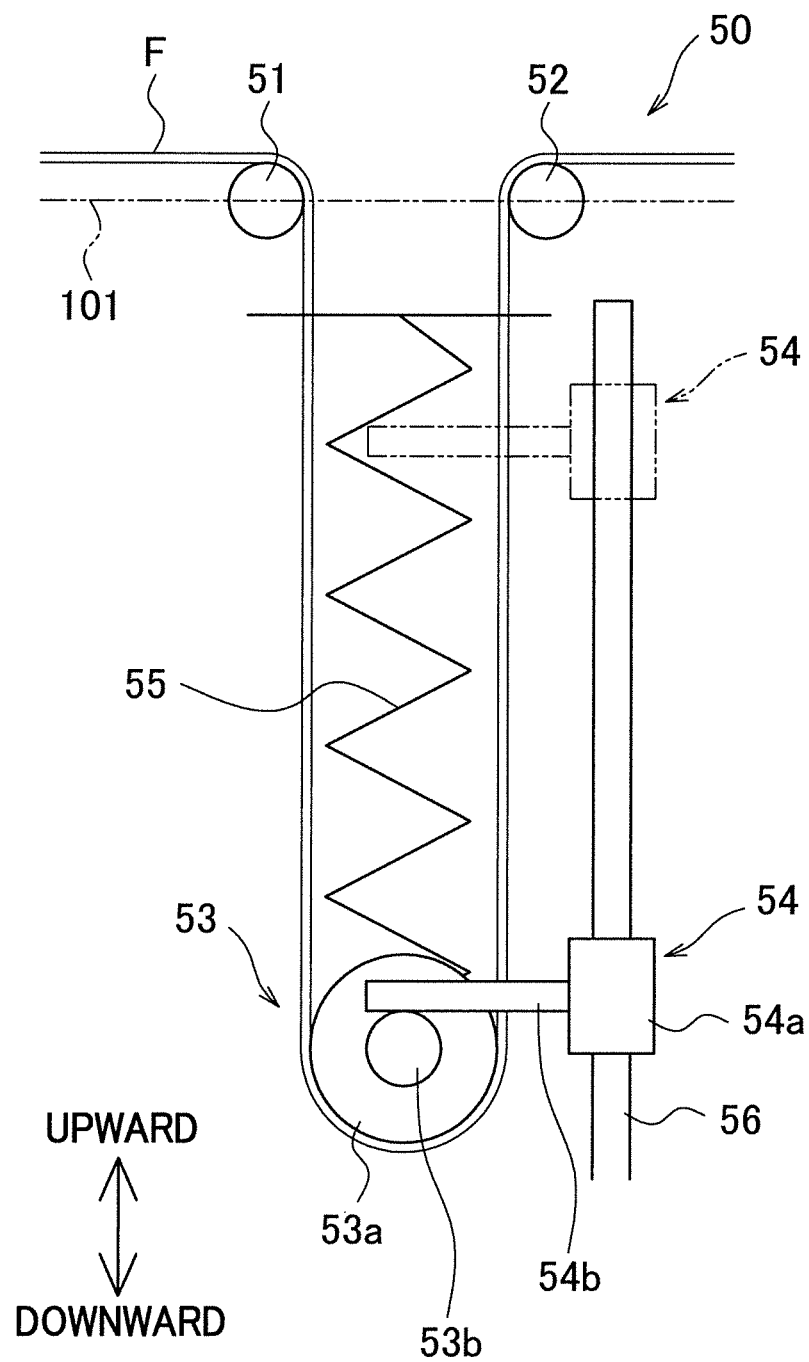
FIG. 5 is a schematic diagram of a fiber bundle storage unit.

The following will describe the structure of the fiber bundle storage unit 50 with reference to FIGS. 4 and 5. Hereinafter, an up-down direction shown in FIG. 5 will be consistently used as an up-down direction. The fiber bundle storage unit 50 is configured to temporarily store a fiber bundle F which is supplied from a bobbin B to the helical winding unit 40. The fiber bundle storage unit 50 includes members such as a first roller 51, a second roller 52, a third roller 53, and a stopper 54 (switching unit).

In the running direction of the fiber bundle F, the first roller 51, the third roller 53, and the second roller 52 are provided in this order from the upstream side, and the fiber bundle F is placed onto each of the rollers 51, 52, and 53. The first roller 51 and the second roller 52 are positionally fixed. As described below, in the running direction, the fiber bundle F is stored between the first roller 51 and the second roller 52. While the first roller 51 and the second roller 52 are provided to be aligned substantially horizontally as shown in FIG. 5, the disclosure is not limited to this arrangement.

The third roller 53 includes a roller main body 53a and a pressed member 53b. The third roller 53 is biased downward by a spring 55 (see FIG. 5). The fiber bundle F guided from the first roller 51 on the upstream side is placed on the circumferential surface of the roller main body 53a, and then guided to the second roller 52 on the downstream side. The pressed member 53b is a part pressed by the later-described stopper 54. The third roller 53 is movable in a direction orthogonal to a linear line 101 connecting the first roller 51 with the second roller 52, i.e., movable in the up-down direction (see an outlined arrow 102 in FIG. 4).

The stopper 54 is configured to switch the state of the fiber bundle storage unit 50 between a storage state and a storage cancellation state as described below. The storage state is a state in which the fiber bundle F is stored by the fiber bundle storage unit 50. The storage cancellation state is a state in which the storing of the fiber bundle F by the fiber bundle storage unit 50 is canceled and the fiber bundle F is being supplied to the helical winding unit 40 from the fiber bundle storage unit 50. The stopper 54 is, to be more specific, configured to prohibit or allow the movement of the third roller 53 in the up-down direction. The stopper 54 includes a movable portion 54a and a press portion 54b.

The movable portion 54a is arranged to be movable in the up-down direction along a shaft 56 extending in the up-down direction. A female screw (not illustrated) is formed on the movable portion 54a, whereas a male screw (not illustrated) is formed on the shaft 56. The female screw of the movable portion 54a is engaged with the male screw of the shaft 56. The shaft 56 can be rotationally driven by a stopper motor 57 (see FIGS. 3 and 4), and the movable portion 54a is movable in the up-down direction in accordance with the rotation of the shaft 56 (see an outlined arrow 103 in FIG. 4).

The press portion 54b contacts the pressed member 53b of the third roller 53 from above to press the pressed member 53b downward. The press portion 54b is fixed to the movable portion 54a. In the up-down direction, the press portion 54b is movable together with the movable portion 54a along the track of the movement of the pressed member 53b. To be more specific, the press portion 54b is movable between a first position (see full lines in FIG. 4) where the third roller 53 is maximally pressed downward and a second position (see two-dot chain lines in FIG. 4) where the third roller 53 is close to the first roller 51 and the second roller 52 compared to the first position.

When the movable portion 54a moves downward while the press portion 54b is in contact with the pressed member 53b, the third roller 53 is pressed by the press portion 54b and moved downward. When the press portion 54b is at the first position and presses the pressed member 53b, the upward movement of the third roller 53 (i.e., movement toward the first roller 51 and the second roller 52 in the up-down direction) is prohibited. Meanwhile, when the press portion 54b is at the second position and not in contact with the pressed member 53b, the movement of the third roller 53 in the up-down direction is allowed.

In the fiber bundle storage unit 50 arranged as described above, the storage amount of the fiber bundle F between the first roller 51 and the second roller 52 is the largest when the press portion 54b of the stopper 54 is at the first position. The position of the third roller in this state is equivalent to a storage position. As the stopper 54 maintains the third roller 53 at the storage position, the fiber bundle storage unit 50 is maintained at the storage state. When the press portion 54b of the stopper 54 is at the second position and the upward movement of the third roller 53 is allowed, it is possible to supply the fiber bundle F from the fiber bundle storage unit 50 to the helical winding unit 40. At this stage, the fiber bundle storage unit 50 is in the storage cancellation state. In this way, the stopper 54 is able to switch the fiber bundle storage unit 50 between the storage state and the storage cancellation state.

Bobbin Supporter

Figure 6:
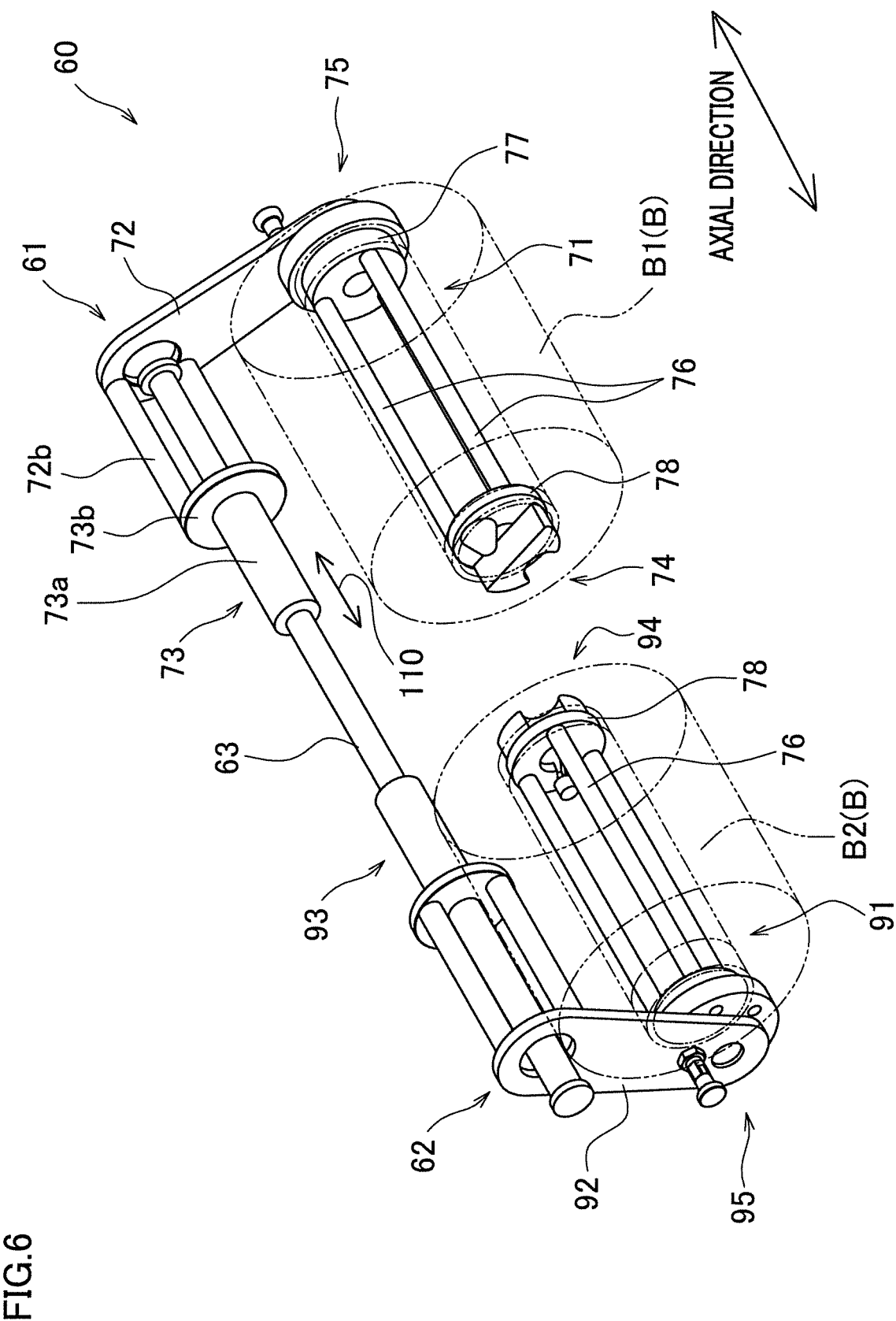
FIG. 6 is a perspective view of a bobbin supporter.

The following will describe the structure of the bobbin supporter 60. To begin with, the bobbin supporter 60 will be outlined with reference to FIGS. 6 to 8B. FIG. 6 is a perspective view of the bobbin supporter 60. Each of FIGS. 7A and 7B is a front elevation of the bobbin supporter 60. Hereinafter, an axial direction shown in FIGS. 6, 7A and 7B will be consistently used as an axial direction. This axial direction is the axial direction of a fixing shaft 63, a first supporting shaft 71, and a second supporting shaft 91 described later.

The bobbin supporter 60 supports two bobbins B to be rotatable. As shown in FIGS. 6 to 8B, the bobbin supporter 60 includes a first bobbin supporter 61, a second bobbin supporter 62, and the fixing shaft 63.

The first bobbin supporter 61 supports one of the bobbins B (bobbin B1) to be rotatable. The second bobbin supporter 62 supports the other one of the bobbins B (bobbin B2) to be rotatable. The first bobbin supporter 61 and the second bobbin supporter 62 are aligned in the axial direction and provided to be substantially symmetrical in the axial direction. The fixing shaft 63 is a member extending in the axial direction. A central portion in the axial direction of the fixing shaft 63 is attached to the supporting frame 11 (see FIG. 1) through an unillustrated fixing tool. The first bobbin supporter 61 is attached to one side portion in the axial direction of the fixing shaft 63 (i.e., right side portion in FIGS. 7A and 7B) whereas the second bobbin supporter 62 is attached to the other side portion in the axial direction of the fixing shaft 63 (i.e., left side portion in FIGS. 7A and 7B). The fixing shaft 63 supports the first bobbin supporter 61 and the second bobbin supporter 62 so that each of these supporters is movable in the axial direction and rotatable about the fixing shaft 63. At the end portions in the axial direction of the fixing shaft 63, below-described two springs 64 (see FIGS. 7A and 7B) are attached, respectively.

The first bobbin supporter 61 and the second bobbin supporter 62 will be detailed with reference to FIGS. 6 to 10B. FIG. 8A is a side elevation of the bobbin supporter 60 shown in FIG. 7A, which is viewed in the direction indicated by an arrow VIII(a). FIG. 8B is a side elevation of the bobbin supporter 60 shown in FIG. 7B, which is viewed in the direction indicated by an arrow VIII(b). FIG. 9A shows a later-described connecting portion 74 viewed in the axial direction. FIG. 9B is a front elevation of the connecting portion 74 of the first bobbin supporter 61 and a connecting portion 94 of the second bobbin supporter 62. FIG. 9C shows a state in which the first supporting shaft 71 and the second supporting shaft 91 are connected by the connecting portions 74 and 94. FIG. 10A shows a state in which a later-described stopping portion 75 allows the rotation of the bobbin B. FIG. 10B shows a state in which the stopping portion 75 stops the rotation of the bobbin B.

As shown in FIGS. 6, 7A and 7B, the first bobbin supporter 61 includes members such as the first supporting shaft 71 to which the bobbin B (bobbin B1) is attached, an arm 72, a movable portion 73, and the connecting portion 74. The first bobbin supporter 61 is arranged such that the first supporting shaft 71 is connected to the movable portion 73 via the arm 72. The movable portion 73 is arranged to be movable in the axial direction along the fixing shaft 63 and rotatable about the fixing shaft 63. With this arrangement, the first supporting shaft 71 is movable in the axial direction and rotatable about the fixing shaft 63. The second bobbin supporter 62 includes members such as the second supporting shaft 91 to which the bobbin B (bobbin B2) is attached, an arm 92, a movable portion 93, and the connecting portion 94. The second bobbin supporter 62 is structurally similar to the first bobbin supporter 61, and the second bobbin supporter 62 and the first bobbin supporter 61 are provided to be symmetrical with respect to an orthogonal plane passing the center in the axial direction of the fixing shaft 63. The first bobbin supporter 61 and the second bobbin supporter 62 are connectable to and disconnectable from each other via the connecting portions 74 and 94. A combination of the first supporting shaft 71 and the second supporting shaft 91 is equivalent to a bobbin supporting shaft. Because the first bobbin supporter 61 and the second bobbin supporter 62 are substantially symmetrical in the axial direction as described above, the first bobbin supporter 61 will be mainly described below, and the second bobbin supporter 62 will be described according to need.

The first supporting shaft 71 includes shafts 76 extending in the axial direction, a base-end-side circular plate member 77, and a leading-end-side circular plate member 78 (see FIG. 6). To the base-end-side circular plate member 77, end portions on the one side in the axial direction of the shafts 76 (i.e., end portions on the opposite side of the second supporting shaft 91 in the axial direction) are fixed. The leading-end-side circular plate member 78 is fixed to the end portions on the other side of the shafts 76 (i.e., end portions on the second supporting shaft 91 side in the axial direction). As the bobbin B1 is fitted to the shafts 76, the base-end-side circular plate member 77, and the leading-end-side circular plate member 78, the first supporting shaft 71 and the bobbin B1 are rotatable together. The first supporting shaft 71 is rotated by the rotation of the bobbin B1. The connecting portion 74 is attached to the leading-end-side circular plate member 78. The second supporting shaft 91 is similarly arranged and hence the second supporting shaft 91 and the bobbin B2 are rotatable together.

The arm 72 extends outward in the radial direction of the first supporting shaft 71. The arm 72 supports the first supporting shaft 71 to be rotatable. An opening 72a (see FIGS. 7A and 8A) is formed in a radially outer part of the arm 72 to allow the fixing shaft 63 and the spring 64 (see FIGS. 7A and 7B) to pass therethrough. With this arrangement, the later-described movable portion 73 is movable in the axial direction. To the radially outer part of the arm 72, a shaft 72b (see FIG. 7A) is fixed. The arm 92 of the second bobbin supporter 62 is similarly arranged.

The movable portion 73 includes a rotation shaft 73a and a biased portion 73b. The rotation shaft 73a extends in the axial direction and is loosely fitted to the fixing shaft 63. With this arrangement, the movable portion 73 is movable in the axial direction along the fixing shaft 63 (see a full-line arrow 110 in FIG. 6) and is rotatable about the fixing shaft 63 (see a full-line arrow 112 shown in FIG. 7B and a full-line arrow 113 shown in FIG. 8B). The biased portion 73b is a disc-shaped portion fixed to an end portion on the one side in the axial direction of the rotation shaft 73a. The biased portion 73b is connected to the arm 72 by a shaft 72b. To an end face on the one side in the axial direction of the biased portion 73b, an end portion on the other side in the axial direction of the spring 64 is fixed. The biased portion 73b is biased toward the center in the axial direction of the fixing shaft 63 by the spring 64. The movable portion 93 of the second bobbin supporter 62 is similarly arranged.

The connecting portion 74 allows the first supporting shaft 71 and the second supporting shaft 91 to be connected to each other and disconnected from each other. As described above, the connecting portion 74 is attached to the leading-end-side circular plate member 78. As shown in FIG. 9A, the connecting portion 74 includes, for example, a first connection member 81 and a second connection member 82.

As shown in FIG. 9B, the first connection member 81 includes a protruding portion 81a, a shaft portion 81b, and a bottom portion 81c. The first connection member 81 is provided at a radially outer part of the leading-end-side circular plate member 78. The protruding portion 81a is substantially circular frustum in shape. The shaft portion 81b is fixed to an end face of the protruding portion 81a, which is close to the leading-end-side circular plate member 78, and the shaft portion 81b is movable along an opening 78a formed in the leading-end-side circular plate member 78 (see a full-line arrow 114 in FIG. 9A). The bottom portion 81c is fixed to an end portion of the shaft portion 81b, which is on the side opposite to the protruding portion 81a. The bottom portion 81c is biased radially outward of the leading-end-side circular plate member 78 by a spring 83. With this arrangement, because the protruding portion 81a partially protrudes radially outward compared to the leading-end-side circular plate member 78, it is possible to prevent the bobbin B fitted to the leading-end-side circular plate member 78 from being detached in the axial direction. When the bobbin B is attached or detached, the first connection member 81 is moved to the inside in the radial direction as compared to the circumferential surface of the leading-end-side circular plate member 78. With this, the protruding portion 81a no longer interferes with the bobbin B. Hence, the bobbin B can be successfully detached or attached. The second connection member 82 is a roughly concave member when viewed in the axial direction. In the radial direction of the leading-end-side circular plate member 78, the second connection member 82 is provided on the side opposite to the first connection member 81. A cutout 82a which is curved when viewed in the axial direction is formed in the second connection member 82. The connecting portion 94 of the second bobbin supporter 62 is similarly arranged.

The first connection member 81 of the connecting portion 74 can be fitted to the second connection member 82 of the connecting portion 94. The second connection member 82 of the connecting portion 74 can be fitted to the first connection member 81 of the connecting portion 94. With this arrangement, as shown in FIG. 9C, the connecting portion 74 and the connecting portion 94 are aligned in the axial direction (i.e., the bobbin B1 and the bobbin B2 are aligned), and these connecting portions can be fitted to each other in a state in which the connecting portions are deviated from each other by 180 degrees in the circumferential direction. As the two connecting portions 74 and 94 are fitted to each other, the first supporting shaft 71 and the second supporting shaft 91 are connected to each other and are rotatable together. As described above, the first supporting shaft 71 and the bobbin B1 are rotatable together whereas the second supporting shaft 91 and the bobbin B2 are rotatable together. For this reason, when the first supporting shaft 71 and the second supporting shaft 91 are connected to each other, the bobbin B1 and the bobbin B2 are rotatable together. In this state, because the connecting portion 74 and the connecting portion 94 are biased by the above-described two springs 64 (see FIGS. 7A and 7B) in directions in which the connecting portions press each other in the axial direction, the connection is reliably maintained. When the connecting portion 74 and the connecting portion 94 are separated from each other in the axial direction (see FIG. 9B), the first supporting shaft 71 and the second supporting shaft 91 are disconnected from each other. In this state, each of the first supporting shaft 71 and the second supporting shaft 91 is independently rotatable about the fixing shaft 63.

The first bobbin supporter 61 includes the stopping portion 75. The stopping portion 75 is provided to stop rotation of the bobbin B. The stopping portion 75 is provided at the base-end-side circular plate member 77 of the first supporting shaft 71 and the arm 72. As shown in FIGS. 10A and 10B, for example, the stopping portion 75 includes a disc 85 and an engagement pin 86. The disc 85 is provided between the base-end-side circular plate member 77 and the arm 72 in the axial direction. The disc 85 is fixed to the base-end-side circular plate member 77 and rotatably supported by the arm 72. In an end face on the arm 72 side in the axial direction of the disc 85, plural holes 85a are formed (see FIGS. 8, 10A, and 10B). The engagement pin 86 is attached to the arm 72. The engagement pin 86 is movable in the axial direction (see a full-line arrow 115 in FIG. 10B) and can be engaged with one of the holes 85a. As shown in FIG. 10A, when a leading end portion 86a of the engagement pin 86 is engaged with none of the holes 85a, the first supporting shaft 71 is rotatable (i.e., the bobbin B1 is rotatable). When, as shown in FIG. 10B, the engagement pin 86 is pressed toward the disc 85 in the axial direction and the leading end portion 86a is engaged with one of the holes 85a, the rotation of the disc 85 is stopped. Hence, the rotation of the first supporting shaft 71 is stopped. The second bobbin supporter 62 has a similar stopping portion 95.

Referring back to FIGS. 7A and 7B, the following will describe a state in which, in the bobbin supporter 60 arranged as described above, the bobbin B1 is attached to the first supporting shaft 71 and the bobbin B2 is attached to the second supporting shaft 91. In FIG. 7A, the fiber bundle F wound on the bobbin B1 is being supplied to the helical winding unit 40 side while the first supporting shaft 71 and the second supporting shaft 91 are connected to each other. A winding terminal end portion of the fiber bundle F wound on the bobbin B2 (i.e., outer end portion in the radial direction of the bobbin) is adhered and fixed to a winding start end portion of the fiber bundle wound on the bobbin B1 (i.e., the inner end portion in the radial direction of the bobbin). With this arrangement, a joint Fc is formed. Due to this, it is possible to uninterruptedly supply the fiber bundle F from the bobbin B2 to the helical winding unit 40 even after the bobbin B1 becomes empty.

As described above, the first supporting shaft 71 and the second supporting shaft 91 are rotatable about the fixing shaft 63. For this reason, as shown in FIGS. 7B and 8B, when disconnected from each other, the first supporting shaft 71 and the second supporting shaft 91 are relatively movable in the direction orthogonal to the axial direction and can be separated from each other. This allows the bobbin B to be moved in the axial direction and detached (see a full-line arrow 111 in FIG. 7B).

Bobbin Replacement Method

The following will describe a bobbin replacement method for the filament winding device 1 arranged as described above, with reference to FIGS. 11 to 14F. This bobbin replacement indicates that, when one of the bobbins B becomes empty while the helical winding unit 40 winds the fiber bundle F onto the liner L, the empty bobbin B is replaced with a new bobbin B while the supply of the fiber bundle F to the helical winding unit 40 is continued from the other one of the bobbins B. FIG. 11 is a flowchart showing a series of steps of the bobbin replacement. FIGS. 12A to 14F show the states of the bobbin supporter 60 in the bobbin replacement ((a), (c), and (e) in each figure) and the states of the fiber bundle storage unit 50 ((b), (d), and (f) in each figure) in order. The series of steps are performed by an operator.

Figure 12A:
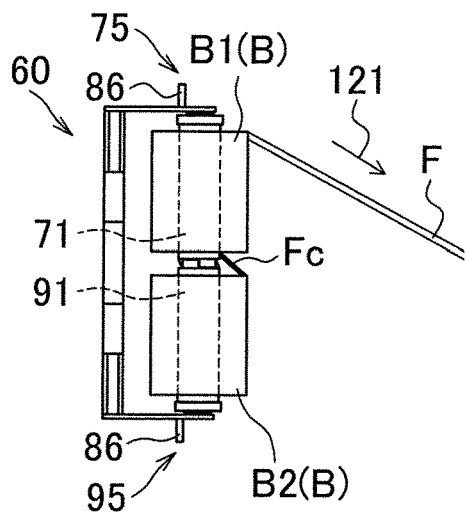
Figure 12B:
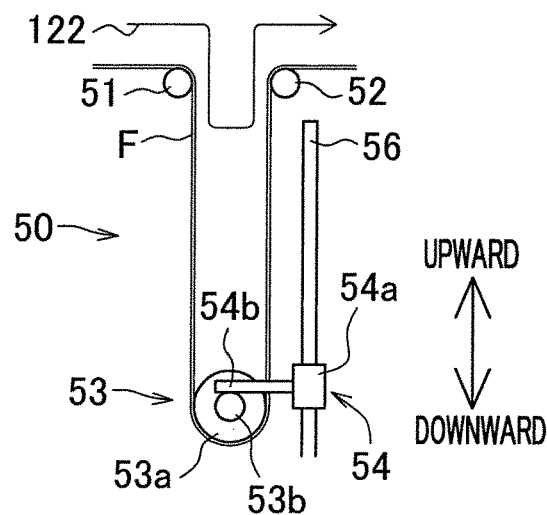
Figure 12C:
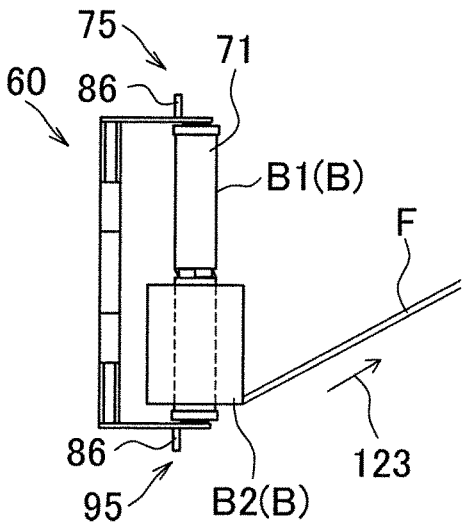
Figure 12D:
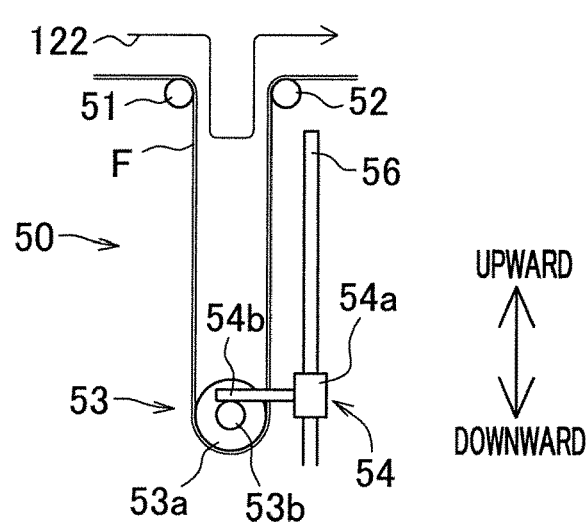

To begin with, in an initial state, as shown in FIG. 12A, the bobbin B1 is attached to the first supporting shaft 71 of the bobbin supporter 60 and the bobbin B2 is attached to the second supporting shaft 91, and the fiber bundle F is being wound on the liner L by the helical winding unit 40 (see FIG. 4). The fiber bundle F is unwound from the bobbin B1 and supplied to the helical winding unit 40 via the fiber bundle storage unit 50 (see a full-line arrow 121 in FIG. 12A and a full-line arrow 122 in FIG. 12B). In this example, the bobbin B1 is equivalent to a supplying bobbin. The bobbin B2 is equivalent to a reserve bobbin. A winding start end portion of the fiber bundle F wound on the bobbin B1 is adhered and fixed to a winding terminal end portion of the fiber bundle F wound on the bobbin B2. (In short, a joint Fc is formed.) The fiber bundle storage unit 50 is in the storage state and the third roller 53 is at the storage position (see FIG. 12B).

Figure 12E:
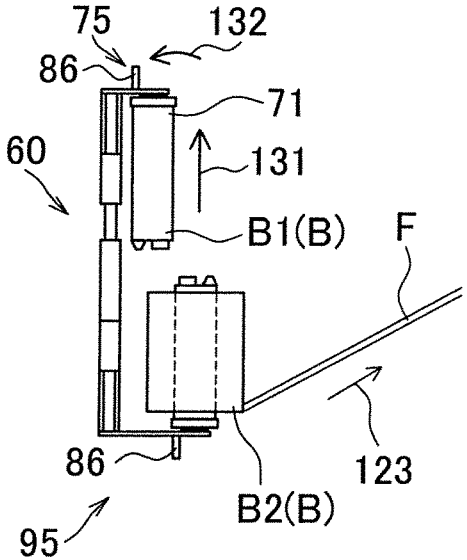
Figure 12F:
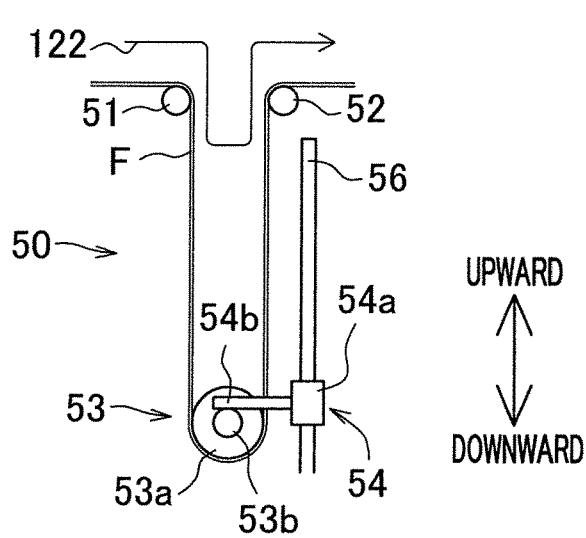

After all of the fiber bundle F wound on the bobbin B1 is unwound and the bobbin B1 becomes empty (see FIG. 12C), the first supporting shaft 71 is moved in the axial direction to be disconnected from the second supporting shaft 91 (S201; see a full-line arrow 131 in FIG. 12E), and the first supporting shaft 71 is further rotated (see a full-line arrow 132 in FIG. 12E). In this state, rotation of the first supporting shaft 71 and the empty bobbin B1 (empty bobbin) has been stopped. Thereafter, the bobbin B1 is moved in the axial direction and detached from the first supporting shaft 71, and a bobbin B3 (new bobbin) is attached to the first supporting shaft 71 (S202; replacement step; see FIG. 13A). After the bobbin B1 becomes empty and before the bobbin replacement is completed, rotation of the bobbin B2 is not stopped and the fiber bundle storage unit 50 is maintained at the storage state. As a result of this, the fiber bundle F is kept unwound from the bobbin B2 and supplied to the helical winding unit 40 via the fiber bundle storage unit 50 (see FIGS. 12D, 12F, and a full-line arrow 122 in 13B).

Figure 13A:
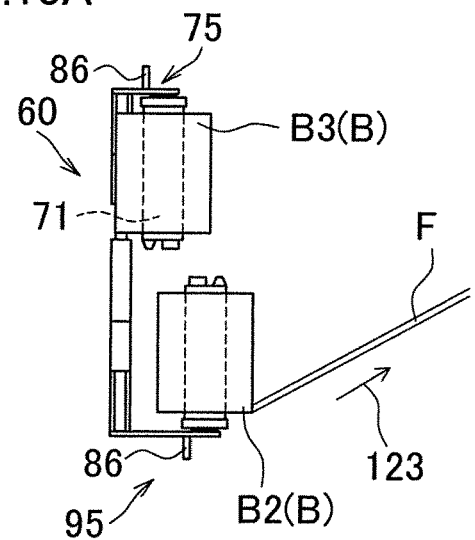
Figure 13B:
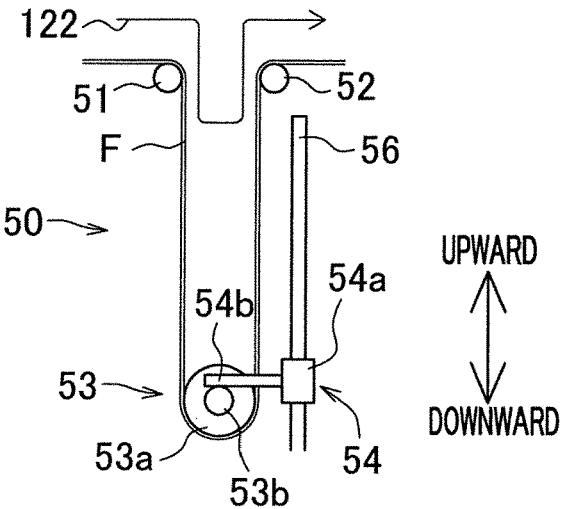
Figure 13C:
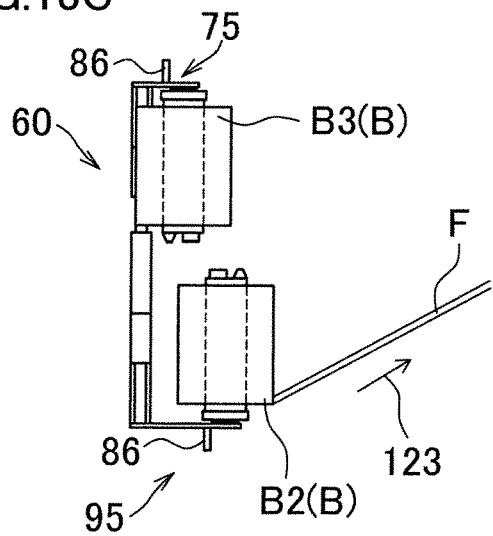
Figure 13D:
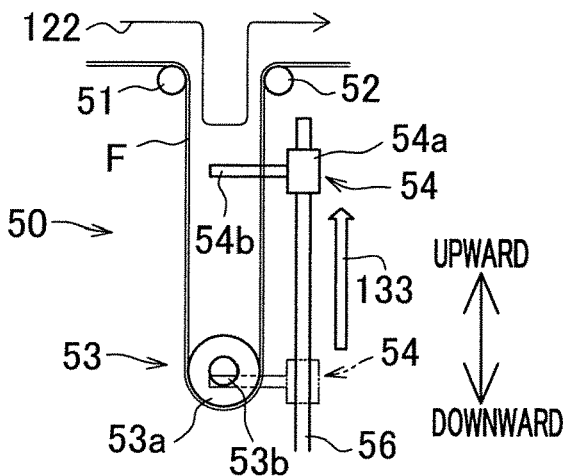

Subsequently, while a state in which the bobbin B2 is rotating and the fiber bundle F is being unwound from the bobbin B2 is maintained (see FIG. 13C), the shaft 56 is rotationally driven to move the stopper 54 upward so that the stopper 54 is moved away from the third roller 53 (see an outlined arrow 133 in FIG. 13D). In this way, the fiber bundle storage unit 50 is switched to the storage cancellation state (S203). As described above, the third roller 53 is biased downward by the spring 55 (see FIG. 5). On this account, immediately after the fiber bundle storage unit 50 is switched to the storage cancellation state, immediate upward movement of the third roller 53 (i.e., decrease in the storage amount of the fiber bundle F) can be suppressed, while the supply of the fiber bundle F from the bobbin B2 to the helical winding unit 40 is continued.

Figure 13E:
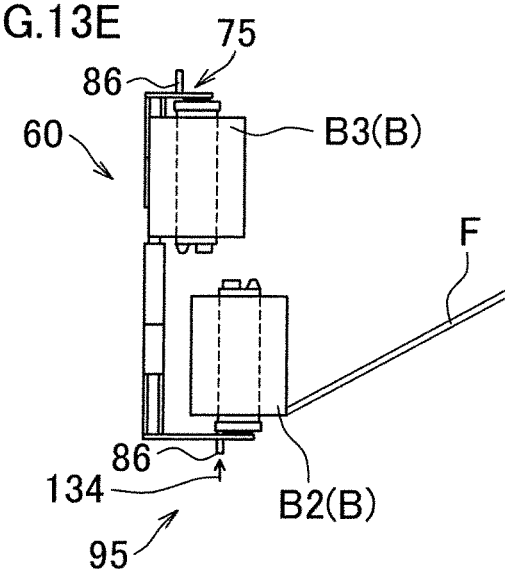
Figure 13F:
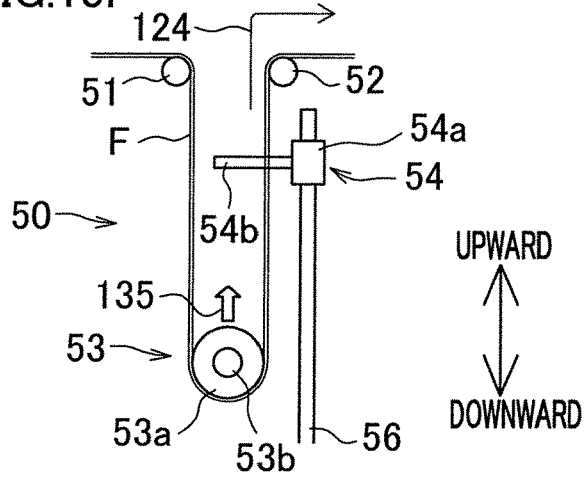
Figure 14A:
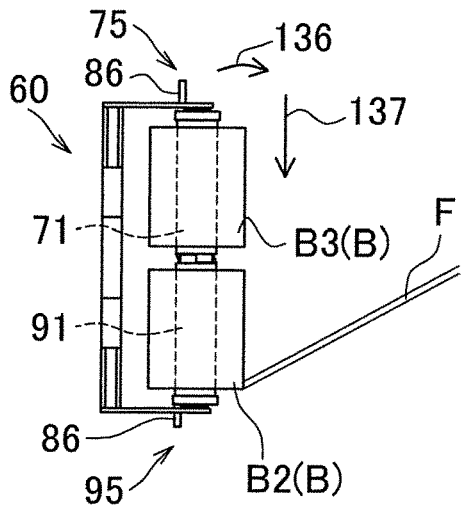
Figure 14B:
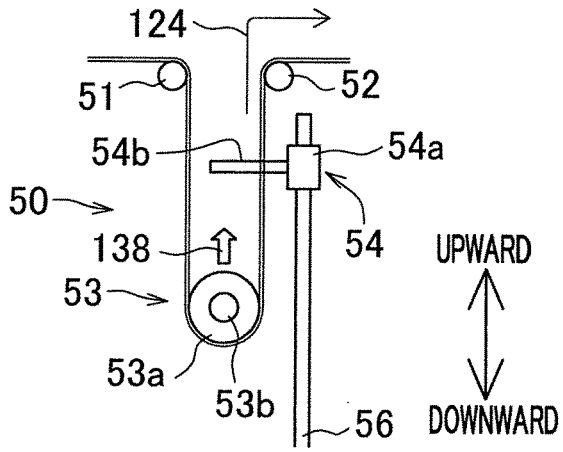
Figure 14C:
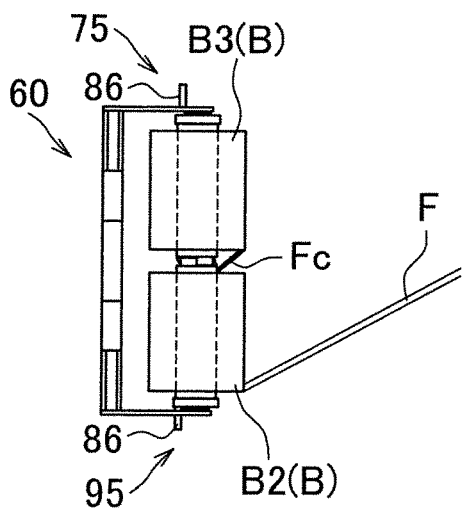
Figure 14D:
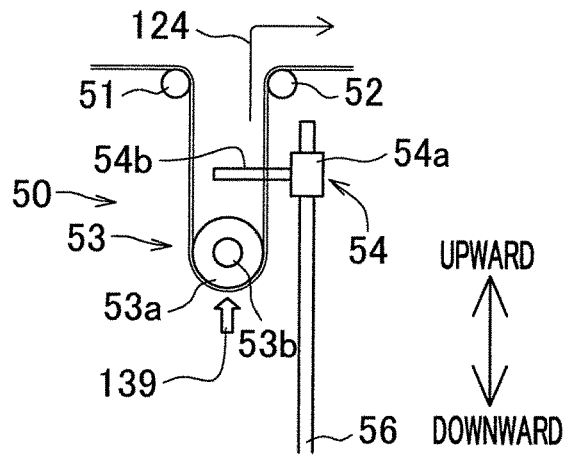
Figure 14E:
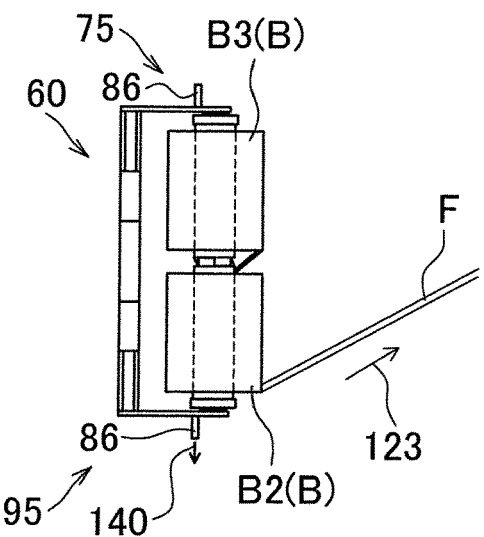
Figure 14F:
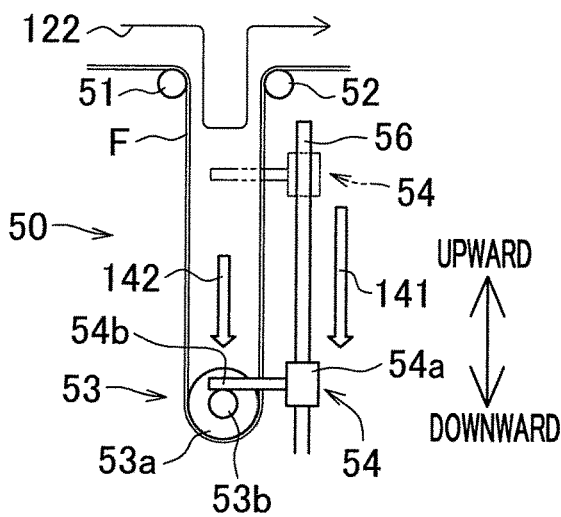

Subsequently, the engagement pin 86 of the stopping portion 95 of the second bobbin supporter 62 is pressed into a hole 85a (see FIGS. 10A and 10B) to forcibly stop the rotation of the bobbin B2 from which the fiber bundle F is being supplied (S204; see a full-line arrow 134 in FIG. 13E). As a result, the fiber bundle F is supplied to the helical winding unit 40 only from the fiber bundle storage unit 50 (see a full-line arrow 124 in FIG. 13F). Consequently, the storage amount of the fiber bundle F in the fiber bundle storage unit 50 starts to decrease, and the third roller 53 starts to move upward (see an outlined arrow 135 in FIG. 13F). Because the engagement pin 86 is engaged with the hole 85a, unintentional rotation of the bobbin B2 is prevented. Furthermore, because rotation of the first supporting shaft 71 has already been stopped, it is unnecessary to press the engagement pin 86 of the stopping portion 75 of the first bobbin supporter 61 into a hole 85a.

Subsequently, the first supporting shaft 71 is rotated to be moved toward the second supporting shaft 91 in the axial direction (see full-line arrows 136 and 137 in FIG. 14A) so that the first supporting shaft 71 is connected to the second supporting shaft 91 again (S205). Then joining is performed to adhere and fix the winding start end portion of the fiber bundle F of the bobbin B2 to the winding terminal end portion of the fiber bundle F of the bobbin B3 by thermocompression bonding or the like so that a joint Fc is formed (S206; joining step; see FIG. 14C). During the operations above, the supply of the fiber bundle F from the fiber bundle storage unit 50 to the helical winding unit 40 is continued. On this account, the storage amount of the fiber bundle F in the fiber bundle storage unit 50 continues to decrease, and the third roller 53 continues to move upward (see an outlined arrow 138 in FIG. 14B and an outlined arrow 139 in FIG. 14D). When the stored fiber bundle F is likely to run out during the operations above, the operator stops the helical winding by operating the control panel 4.

Subsequently, the engagement pin 86 of the second bobbin supporter 62 is pulled out from the hole 85a (see FIGS. 10A and 10B) (see a full-line arrow 140 in FIG. 14E) to cancel the rotation stopped state of the second supporting shaft 91 (S207; rotation restart step). As a result, the supply of the fiber bundle F from the bobbin B2 to the helical winding unit 40 starts again. Because the first supporting shaft 71 is connected to the second supporting shaft 91, the rotation stopped state of the first supporting shaft 71 is canceled at the same time as the cancelation of the rotation stopped state of the second supporting shaft 91.

Lastly, the stopper 54 is moved downward to move the third roller 53 downward (see outlined arrows 141 and 142 in FIG. 14F), with the result that the fiber bundle storage unit 50 is returned to the storage state (S208). As such, the series of steps of the bobbin replacement are completed.

As described above, the state of the fiber bundle storage unit 50 is switched between the storage state and the storage cancellation state by the stopper 54. When it is unnecessary to stop the rotation of the bobbins B, the fiber bundle storage unit 50 is maintained at the storage state and hence the fiber bundle F is stored in the fiber bundle storage unit 50. Meanwhile, when the joining needs to be done, the fiber bundle storage unit 50 is switched to the storage cancellation state. With this, it becomes possible to perform the joining while the fiber bundle F stored in the fiber bundle storage unit 50 is being supplied to the helical winding unit 40, even though the rotation of the two bobbins B is stopped. On this account, the joining can be done while the winding of the fiber bundle F by the helical winding unit 40 is being performed.

In addition to the above, the fiber bundle storage unit 50 is set at the storage state as the third roller 53 is maintained at the storage position by the stopper 54, and the fiber bundle storage unit 50 is set at the storage cancellation state as the third roller 53 is allowed to move to a position close to the first roller 51 and the second roller 52 as compared to the storage position. In this way, switching between the storage state and the storage cancellation state is realized by the simple arrangement.

In addition to the above, when the third roller 53 is at the storage position, the movement of the third roller 53 toward the first roller 51 and the second roller 52 in the up-down direction is prohibited by the stopper 54. It is therefore possible to maintain the fiber bundle storage unit 50 at the storage state. Furthermore, when rotation of the two bobbins B is stopped to perform the joining, the movement of the third roller 53 toward the first roller 51 and the second roller 52 in the up-down direction is allowed. Hence, the third roller 53 becomes movable to shorten the fiber bundle F stored in the fiber bundle storage unit 50. (In other words, the fiber bundle storage unit 50 is switched to the storage cancellation state.) In this way, by the simple arrangement, the fiber bundle storage unit 50 can be maintained at the storage state and the fiber bundle storage unit 50 can be switched from the storage state to the storage cancellation state.

When the press portion 54b of the stopper 54 is at the first position, the third roller 53 is maintained at the storage position and the fiber bundle storage unit 50 is maintained at the storage state. As the press portion 54b moves from the first position to the second position, the movement of the third roller 53 is allowed and the fiber bundle storage unit 50 is switched to the storage cancellation state. Furthermore, as the press portion 54b moves from the second position to the first position, the third roller 53 is returned to the storage position by the press portion 54b and the fiber bundle storage unit 50 returns to the storage state. In this way, the state of the fiber bundle storage unit 50 is switched between the storage state and the storage cancellation state by the simple arrangement.

In addition to the above, even when the helical winding unit 40 is in operation, the joining can be performed at any timing by switching the fiber bundle storage unit 50 to the storage cancellation state and forcibly stopping the rotation of the bobbins B by the stopping portions 75 or 95. Furthermore, because unintentional rotation of the two bobbins B is prevented by the stopping portions 75 or 95 during the joining which is performed while the helical winding unit 40 is in operation, the joining can be safely done.

In addition to the above, because the two bobbins B are supported to be aligned in the axial direction and can be rotated together with the first supporting shaft 71 and the second supporting shaft 91, the two bobbins B rotate certainly at the same rotation speed. It is therefore possible to ensure prevention of problems such as twist of the end portions of the fiber bundles F of the two bobbins B that are connected to each other.

When the first supporting shaft 71 and the second supporting shaft 91 are connected to each other by the connecting portions 74 and 94, the first supporting shaft 71 and the second supporting shaft 91 rotate together and the two bobbins B rotate at the same rotation speed. When one of the bobbins B becomes empty and the supply of the fiber bundle F to the helical winding unit 40 is continued from the other bobbin B, the rotation of only one of the bobbins B can be stopped by disconnecting the first supporting shaft 71 from the second supporting shaft 91. On this account, the replacement of the empty bobbin can be done while the supply of the fiber bundle F from the other bobbin B to the helical winding unit 40 is continued (i.e., without canceling the storing of the fiber bundle F by the fiber bundle storage unit 50). In other words, it is unnecessary to cancel the storing of the fiber bundle F during the replacement, and cancelation of the storing of the fiber bundle F to stop rotation of the two bobbins B is only required during the joining. The time for keeping the fiber bundle storage unit 50 to be in the storage cancellation state is therefore short, and the fiber bundle F stored in the fiber bundle storage unit 50 is less likely to run out.

In addition to the above, the bobbin supporter 60 rotatably supports end portions of the first supporting shaft 71 and the second supporting shaft 91, which are on the side opposite to the connecting portions 74 and 94 in the axial direction. Furthermore, the first supporting shaft 71 and the second supporting shaft 91 can be separated from each other in the state of being disconnected from each other. Therefore, in the replacement, the bobbin can be detached or attached by separating the first supporting shaft 71 and the second supporting shaft 91 from each other. This suppresses the device from being structurally complicated.

In addition to the above, the first supporting shaft 71 and the second supporting shaft 91 are movable at least in the direction orthogonal to the axial direction. In other words, it is possible to arrange the shaft center of the first supporting shaft 71 and the shaft center of the second supporting shaft 91 to be deviated from each other. With this arrangement, the bobbins B (bobbins B1 and B3) attached to the first supporting shaft 71 can be detached or attached by utilizing the space on the second supporting shaft 91 side in the axial direction. Similarly, the bobbin B (bobbin B2) attached to the second supporting shaft 91 can be detached or attached by utilizing the space on the first supporting shaft 71 side in the axial direction. It is therefore possible to avoid the increase in size of the device.

In addition to the above, before the rotation of the bobbin B2 is stopped, the fiber bundle storage unit 50 is switched from the storage state to the storage cancellation state. On this account, the joining step can be performed while the fiber bundle F is supplied from the fiber bundle storage unit 50 to the helical winding unit 40, even after the rotation of the bobbin B2 is stopped. Furthermore, as the fiber bundle storage unit 50 is switched from the storage cancellation state to the storage state after the rotation restart step, the fiber bundle F can be stored again. As such, the joining step can be executed while the winding of the fiber bundle F is being performed.

In addition to the above, because the fiber bundle storage unit 50 is maintained at the storage state in the replacement step, the fiber bundle F supplied from the bobbin B can be stored in the fiber bundle storage unit 50 even during the replacement step, with the result that the time in which the fiber bundle storage unit 50 is maintained at the storage cancellation state is short. For this reason, the fiber bundle F stored in the fiber bundle storage unit 50 is less likely to run out.

The following will describe modifications of the above-described examples. The members identical with those in the example above will be denoted by the same reference numerals and the explanations thereof are not repeated.

(1) In the examples above, rotation of the bobbin B2 is not stopped in the disconnection of the first supporting shaft 71 and the second supporting shaft 91 (S201) and in the replacement step (S202), but the disclosure is not limited to this arrangement. The rotation of the bobbin B2 may be stopped before these operations.

(2) In the examples above, the winding start end portion of the fiber bundle F of the bobbin B2 is fixed and adhered to the winding terminal end portion of the fiber bundle F of the bobbin B3 by thermocompression bonding or the like in the joining step (S206), but the disclosure is not limited to this arrangement. For example, when a fiber bundle not impregnated with resin is wound onto a liner L, a joining step of connecting end portions of fiber bundles may be performed using a yarn joining device such as a splicer and a knotter.

(3) In the examples above, the third roller 53 of the fiber bundle storage unit 50 is movable in the direction vertical to the linear line 101. However, the disclosure is not limited to this arrangement. The third roller 53 may be movable in another direction as long as the direction intersects with the linear line 101.

(4) In the examples above, the third roller 53 of the fiber bundle storage unit 50 is biased downward by the spring 55, but the disclosure is not limited to this arrangement. For example, the third roller 53 may be biased not downward. Alternatively, the third roller 53 may be biased only by the gravity.

(5) The arrangement for moving the stopper 54 in the up-down direction is not limited to the arrangement described above. For example, the stopper 54 may have a so-called rack-and-pinion structure. Alternatively, the stopper 54 may be driven in the up-down direction by an air cylinder or the like. Alternatively, the stopper 54 may be arranged to be manually movable.

(6) In the examples above, the stopper 54 is movable in the up-down direction, but the disclosure is not limited to this arrangement. For example, as shown in FIG. 15, in a fiber bundle storage unit 50a, the stopper 54 may be arranged to be only rotatable about a shaft 56a (see a press portion 54b indicated by two-dot chain lines). In this arrangement, the press portion 54b presses down the pressed member 53b of the third roller 53 at the storage position to prohibit the movement in the up-down direction of the third roller 53 (storage state), and the press portion 54b rotates to move away from the pressed member 53b to allow the movement in the up-down direction of the third roller 53 (storage cancellation state). In other words, the stopper 54 has a function of maintaining the fiber bundle storage unit 50a in the storage state and a function of switching the state of the fiber bundle storage unit 50a from the storage state to the storage cancellation state. In this modification, when the third roller 53 having been allowed to move and having been moved upward is moved downward, the third roller 53 may be pressed down by a driving source such as an air cylinder 99, or the third roller 53 may be manually moved by the operator.

(7) In the examples above, the stopper 54 is able to prohibit or allow the movement of the third roller 53, but the disclosure is not limited to this arrangement. For example, the third roller 53 may be movable by a driving source such as an unillustrated motor. In this example, the state of the fiber bundle storage unit 50 can be switched between the storage state and the storage cancellation state by the motor.

(8) In the examples above, the first supporting shaft 71 and the second supporting shaft 91 are both rotatable about the fixing shaft 63, but the disclosure is not limited to this arrangement. Only one of these shafts may be rotatable. The first supporting shaft 71 and the second supporting shaft 91 can be separated from each other when at least one of these shafts is rotatable.

(9) As an arrangement for attaching or detaching the bobbins B, the first supporting shaft 71 and the second supporting shaft 91 may not be rotatable and may be movable only in the axial direction. Any type of arrangement may be employed on condition that a space for detaching or attaching the bobbins B by moving the bobbins B in the axial direction is secured.

(10) The first supporting shaft 71 and the second supporting shaft 91 may not be rotatable together with the bobbins B. The bobbin supporter 60 may not include the first supporting shaft 71 and the second supporting shaft 91 which are connectable to each other and disconnectable from each other. For example, a bobbin shaft may support two bobbins B as described in Japanese Laid-Open Patent Publication No. 2014-231145.

(11) In the examples above, the bobbin supporter 60 includes the stopping portions 75 and 95, but the disclosure is not limited to this arrangement. For example, the bobbin supporter may not include a stopping portion, and an apparatus for stopping the rotation of the bobbins B may be additionally provided.

(12) In the examples above, the helical winding unit 40 is the winding unit, but the disclosure is not limited to this arrangement. The examples may be applied to the hoop winding unit 30.

The invention claimed is:

1. A filament winding device comprising:
a winder configured to wind a fiber bundle onto a liner;
a bobbin supporting shaft that rotatably supports a supplying bobbin supplying the fiber bundle to the winder and a reserve bobbin different from the supplying bobbin, the supplying bobbin and the reserve bobbin supported in a state in which a winding start end portion of a fiber bundle wound on the supplying bobbin is connected to a winding terminal end portion of a fiber bundle wound on the reserve bobbin; and
a fiber bundle storage unit provided between the bobbin supporting shaft and the winder in a running direction of the fiber bundle and temporarily stores the fiber bundle supplied to the winder, the fiber bundle storage unit including:
a switch that is able to switch a state of the fiber bundle storage unit between a storage state in which the fiber bundle is stored by the fiber bundle storage unit and a storage cancellation state in which storing the fiber bundle by the fiber bundle storage unit is canceled and the fiber bundle is being supplied from the fiber bundle storage unit to the winder, wherein the bobbin supporting shaft is able to support the supplying bobbin and the reserve bobbin to be aligned in an axial direction of the bobbin supporting shaft, and the supplying bobbin and the reserve bobbin are rotatable together, and wherein the bobbin supporting shaft includes:

a first supporting shaft rotatable together with one of the supplying bobbin and the reserve bobbin;

a second supporting shaft rotatable together with the other one of the supplying bobbin and the reserve bobbin; and a connecting portion provided between the first supporting shaft and the second supporting shaft in the axial direction and is able to connect the first supporting shaft to the second supporting shaft to be rotatable together and disconnect the first supporting shaft from the second supporting shaft.

2. The filament winding device according to claim 1, wherein the fiber bundle storage unit includes:

a first roller on which the fiber bundle is placed;

a second roller on which the fiber bundle is placed, the fiber bundle being stored between the first roller and the second roller in the running direction; and a third roller provided between the first roller and the second roller in the running direction and movable relative to the first roller and the second roller in an intersecting direction that intersects with a linear line connecting the center of the first roller with the center of the second roller, and the switch causing the fiber bundle storage unit to be in the storage state by maintaining the third roller at a predetermined storage position in the intersecting direction, and causing the fiber bundle storage unit to be in the storage cancellation state by allowing the third roller at the storage position to move to a position close to the first roller and the second roller compared to the storage position in the intersecting direction.

3. The filament winding device according to claim 2, wherein the switch includes a stopper that is able to prohibit the third roller from moving toward the first roller and the second roller in the intersecting direction and to allow the third roller to move toward the first roller and the second roller in the intersecting direction.

4. The filament winding device according to claim 3, wherein the stopper includes a press portion capable of pressing the third roller away from the first roller and the second roller in the intersecting direction, and the press portion is movable between a first position where the third roller is pressed and maintained at the storage position and a second position where the press portion is close to the first roller and the second roller compared to the first position in the intersecting direction.

5. The filament winding device according to claim 1, further comprising a stopping portion configured to stop rotation of the supplying bobbin and rotation of the reserve bobbin.

6. The filament winding device according to claim 1, further comprising:

a supporter that rotatably supports end portions of the first supporting shaft and the second supporting shaft, the end portions being on the side opposite to the connecting portion in the axial direction, when the first supporting shaft is disconnected from the second supporting shaft, the supporter being able to separate the first supporting shaft from the second supporting shaft.

7. The filament winding device according to claim 6, wherein at least one of the first supporting shaft or the second supporting shaft is movable at least in a direction orthogonal to the axial direction, when the first supporting shaft is disconnected from the second supporting shaft.

8. A bobbin replacement method for a filament winding device including: a winder configured to wind a fiber bundle onto a liner; and a bobbin supporting shaft that rotatably supports a supplying bobbin supplying the fiber bundle to the winder and a reserve bobbin different from the supplying bobbin, the supplying bobbin and the reserve bobbin supported in a state in which a winding start end portion of a fiber bundle wound on the supplying bobbin is connected to a winding terminal end portion of a fiber bundle wound on the reserve bobbin, the bobbin replacement method being a method of replacing an empty bobbin with a new bobbin while supply of the fiber bundle to the winding unit is continued from the reserve bobbin, when the supplying bobbin becomes empty while the winding unit is winding the fiber bundle onto the liner, the bobbin supporting shaft being able to support the supplying bobbin and the reserve bobbin to be aligned in an axial direction of the bobbin supporting shaft, and the supplying bobbin and the reserve bobbin being rotatable together, the bobbin supporting shaft including: a first supporting shaft rotatable together with one of the supplying bobbin and the reserve bobbin; a second supporting shaft rotatable together with the other one of the supplying bobbin and the reserve bobbin; and a connecting portion provided between the first supporting shaft and the second supporting shaft in the axial direction and is able to connect the first supporting shaft to the second supporting shaft to be rotatable together and disconnect the first supporting shaft from the second supporting shaft, the bobbin replacement method comprising:

a replacement step of, when the empty bobbin is attached to one of the first supporting shaft and the second supporting shaft, detaching the empty bobbin from the one of the first supporting shaft and the second supporting shaft and attaching the new bobbin to the one of the first supporting shaft and the second supporting shaft, while the first supporting shaft and the second supporting shaft are disconnected and rotation of the empty bobbin is stopped;

a joining step of joining a winding start end portion of a fiber bundle wound on the new bobbin with a winding terminal end portion of a fiber bundle wound on the reserve bobbin while rotation of the new bobbin and rotation of the reserve bobbin are stopped, after the replacement step; and a rotation restart step of canceling a rotation stopped state of the new bobbin and a rotation stopped state of the reserve bobbin while the first supporting shaft and the second supporting shaft are connected, after the joining step, the filament winding device further including a fiber bundle storage unit that is switchable between a storage state in which the fiber bundle storage unit temporarily stores the fiber bundle that is to be supplied to the winder and a storage cancellation state in which the storage state is canceled, and the fiber bundle storage unit being maintained at the storage state at least until the replacement step, the fiber bundle storage unit being switched from the storage state to the storage cancellation state before rotation of the reserve bobbin is stopped, and further the fiber bundle storage unit being switched from the storage cancellation state to the storage state after the rotation restart step.

9. The bobbin replacement method according to claim 8, wherein, in the replacement step, rotation of the reserve bobbin is not stopped and the fiber bundle storage unit is maintained at the storage state.

* * * * *